US010887376B2

(12) United States Patent
Chung et al.

(10) Patent No.: US 10,887,376 B2
(45) Date of Patent: Jan. 5, 2021

(54) ELECTRONIC SYSTEM WITH CUSTOM NOTIFICATION MECHANISM AND METHOD OF OPERATION THEREOF

(71) Applicant: Samsung Electronics Co., Ltd., Suwon-si (KR)

(72) Inventors: Wook Jin Chung, Sunnyvale, CA (US); Mansoor Malik, Sunnyvale, CA (US); Pirooz Chubak, San Jose, CA (US); Yunchan Paik, San Jose, CA (US); Mohsin Amjed, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 14/691,284

(22) Filed: Apr. 20, 2015

(65) Prior Publication Data

US 2016/0044093 A1 Feb. 11, 2016

Related U.S. Application Data

(60) Provisional application No. 62/035,339, filed on Aug. 8, 2014.

(51) Int. Cl.
*H04L 29/08* (2006.01)
*H04W 4/21* (2018.01)

(52) U.S. Cl.
CPC .............. *H04L 67/10* (2013.01); *H04L 67/22* (2013.01); *H04L 67/306* (2013.01); *H04W 4/21* (2018.02)

(58) Field of Classification Search
CPC ....... H04L 67/306; H04L 67/22; H04L 67/10; G06F 17/30867; G06F 3/04842; G06F 16/951; G06F 16/9535; G06Q 30/02; G06Q 50/01; G06Q 10/06; G06Q 10/109; G06Q 30/0255; G06Q 30/0261; G06Q 30/0277; G06Q 30/0631; G06Q 30/0641; G06Q 30/08; G06Q 10/0631; G06Q 10/06313; G06Q 10/0633; G06Q 10/06393; G06Q 10/20; G06Q 20/08; G06Q 20/105;

(Continued)

(56) References Cited

U.S. PATENT DOCUMENTS 9,680,961 B1 * 6/2017 Katzer .................... H04L 67/32
2008/0114639 A1 5/2008 Meek (Continued)

FOREIGN PATENT DOCUMENTS

CN 101938710 A 1/2011

OTHER PUBLICATIONS

Office Action dated Jun. 19, 2019 in connection with Chinese Patent Application No. 201580042005.3, 18 pages.

(Continued)

*Primary Examiner* — Chinyere Mpamugo

(57) ABSTRACT

An electronic system includes: a control unit configured to: generate a media content for presenting on a device including a subcontent based on a content template, which includes a configurable element, determine a user information for identifying the device within a context, and update the subcontent with the configurable element, which is adjusted based on the media content and the context, and a communication interface, coupled to the control unit, configured to communicate the subcontent for presenting on the device.

11 Claims, 10 Drawing Sheets

(58) Field of Classification Search
CPC .. G06Q 20/123; G06Q 20/145; G06Q 20/322; G06Q 20/3227; G06Q 20/36; G06Q 20/3674; G06Q 20/382; G06Q 20/3829; G06Q 20/40; G06Q 30/016; G06Q 30/0224; G06Q 30/0244; G06Q 30/0267; G06Q 30/0269; G06Q 30/0282; G06Q 30/0283; G06Q 30/06; G06Q 30/0613; G06Q 30/0621; G06Q 30/0639; G06Q 50/22; G06Q 30/0207–0277; H04N 21/812; H04N 21/25841; H04N 21/4882; H04N 21/6125; H04N 21/84; G02B 2027/0178; G02B 27/0172; G02B 2027/014; G06N 20/00; H04W 4/21
See application file for complete search history.

(56) References Cited

U.S. PATENT DOCUMENTS

| | | | | |
|---|---|---|---|---|
| 2008/0120182 | A1* | 5/2008 | Arnold | G06Q 30/02 705/14.26 |
| 2008/0249836 | A1 | 10/2008 | Angell | |
| 2008/0276270 | A1 | 11/2008 | Kotaru et al. | |
| 2009/0187463 | A1 | 7/2009 | DaCosta | |
| 2010/0076851 | A1* | 3/2010 | Jewell, Jr. | G06Q 30/02 705/14.67 |
| 2010/0114720 | A1 | 5/2010 | Jones | |
| 2011/0178864 | A1* | 7/2011 | Error | G06Q 40/00 705/14.41 |
| 2012/0084820 | A1 | 4/2012 | Wang et al. | |
| 2013/0085860 | A1* | 4/2013 | Summers | G06Q 30/02 705/14.58 |
| 2013/0275879 | A1 | 10/2013 | Dharmaji | |
| 2014/0032208 | A1 | 1/2014 | Liu et al. | |
| 2014/0205196 | A1* | 7/2014 | Freedman | G06T 11/60 382/217 |
| 2014/0245335 | A1 | 8/2014 | Holden et al. | |
| 2014/0289766 | A1* | 9/2014 | Tsurumoto | B61L 15/0072 725/35 |
| 2015/0161643 | A1* | 6/2015 | Randell | G06Q 30/0261 705/14.26 |
| 2015/0248615 | A1* | 9/2015 | Parra | A61B 5/7275 706/12 |

OTHER PUBLICATIONS

Examination Report in connection with Indian Application No. 201737006814 dated Nov. 26, 2019, 4 pages.
Office Action dated Mar. 25, 2020 in connection with Chinese Patent Application No. 201580042005.3, 19 pages.
The Third Office Action in connection with Chinese Application No. 201580042005.3 dated Aug. 26, 2020, 14 pages.
Communication pursuant to Article 94(3) EPC in connection with European Application No. 15829178.1 dated Jun. 24 2020, 7 pages.

* cited by examiner

100

| EVENT | ORIGINAL AD | DYNAMIC VERSION | DYNAMIC DATA | FINAL AD COPY |
|---|---|---|---|---|
| 0:05 S | "HEY EVERYONE, ARE YOU READY!?" | "HEY {**AUDIENCE TYPE**}, ARE YOU READY?" | AUDIENCE IS A SINGLE MALE. | WITH BACKGROUND MUSIC, THERE IS A TEXT THAT SAYS "HEY **DUDE**, ARE YOU READY!?" |
| 0:12 S | ON A HOT SUNNY DAY, NOTHING IS BETTER THAN A COLD ICE COFFEE | ON A **{WEATHER}**, NOTHING IS BETTER THAN A **{PRODUCT}** | WEATHER IS COLD WINTER. PRODUCT IS A HOT CHOCOLATE. | THERE IS A VIDEO CLIP OF A HOT CHOCOLATE IN A WINTER WIND. |
| 0:18 S | FRESHLY BREWED AT YOUR LOCAL MCDONALD | FRESHLY BREWED AT **{NEAREST MCDONALDS LOCATION}** | NEAREST MCDONALD IS ON EL CAMINO AND LAWRENCE EXPY | THE HOT CHOCOLATE IS BEING POURED WHILE THERE IS A MAP OF THE MCDONALDS LOCATION ON EL CAMINO AND LAWRENCE EXPY. |
| 0:25 S | COME GET IT NOW! | SHAKE YOUR PHONE AND GET A COUPON! | THERE IS A PHONE PAIRED WITH THE TV. | THERE IS AN OVERLAY THAT SUGGEST SHAKING THE PHONE FOR A COUPON. |

ELECTRONIC SYSTEM WITH CUSTOM NOTIFICATION MECHANISM AND METHOD OF OPERATION THEREOF

CROSS-REFERENCE TO RELATED APPLICATION(S)

This application claims the benefit of U.S. Provisional Patent Application Ser. No. 62/035,339 filed Aug. 8, 2014, and the subject matter thereof is incorporated herein by reference thereto.

TECHNICAL FIELD

An embodiment of the present invention relates generally to an electronic system, and more particularly to a system for custom notification mechanism.

BACKGROUND

Modern portable consumer and industrial electronics, especially client devices such as electronic systems, cellular phones, portable digital assistants, and combination devices are providing increasing levels of functionality to support modem life including location-based information services. Research and development in the existing technologies can take a myriad of different directions.

Personalized content services allow users to create, transfer, store, and/or consume information in order for users to create, transfer, store, and consume in the "real world." One such use of personalized content services is to efficiently transfer or guide users to the desired product or service.

Electronic system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

However, an electronic system with improved custom notification mechanism to customize system access has become a paramount concern for the consumer. The inability decreases the benefit of using the system.

Thus, a need still remains for an electronic system with custom notification mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including: a control unit configured to: generate a media content for presenting on a device including a subcontent based on a content template, which includes a configurable element, determine a user information for identifying the device within a context, update the subcontent with the configurable element, which is adjusted based on the media content and the context, and a communication interface, coupled to the control unit, configured to communicate the subcontent for presenting on the device.

An embodiment of the present invention provides a method of operation of an electronic system including: generating a media content for presenting on a device including a subcontent based on a content template, which includes a configurable element; determining a user information with a control unit for identifying the device within a context; and updating the subcontent with the configurable element, which is adjusted based on the media content and the context for presenting on the device.

An embodiment of the present invention provides a non-transitory computer readable medium including instructions for execution by a control unit including: generating a media content for presenting on a device including a subcontent based on a content template, which includes a configurable element; determining a user information for identifying the device within a context; and updating the subcontent with the configurable element, which is adjusted based on the media content and the context for presenting on the device.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

FIG. 5 is an example of the media content.

DETAILED DESCRIPTION

Figure 1:
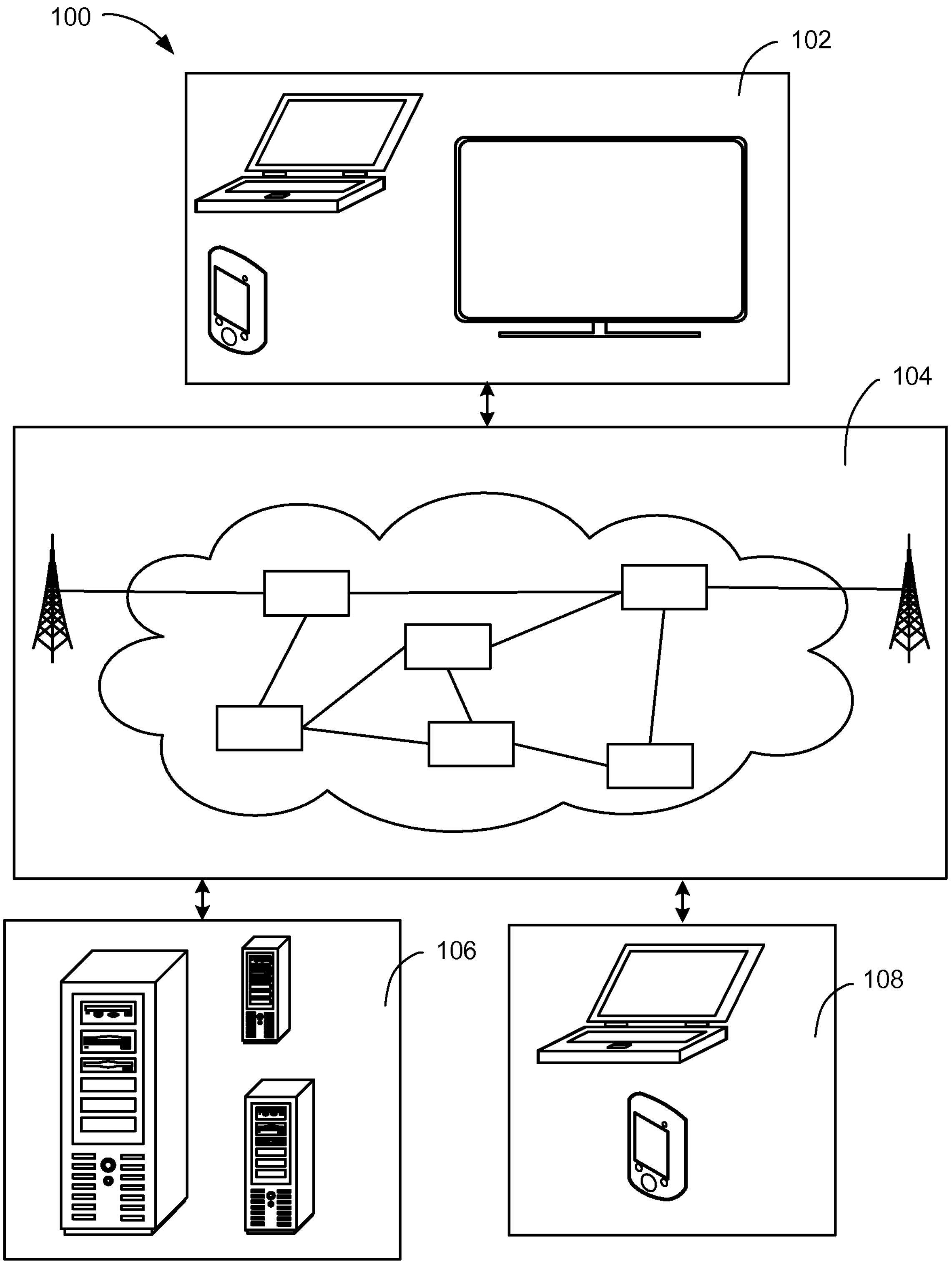
FIG. 1 is an electronic system with custom notification mechanism in an embodiment of the present invention.

One embodiment of the present invention updates a media content dynamically by adjusting a configurable element to include a substitution content to improve the efficiency of delivering the media content most suited for a user. By adjusting the configurable element, an electronic system can provide the media content more relevant to the user. As a result, the electronic system improves the efficiency of the delivery of the media content for enhanced user experience operating the electronic system, a first device, a third device, or a combination thereof.

One embodiment of the present invention updates the media content dynamically by adjusting the configurable element according to a presentation context, a user context, or a combination thereof to improve a content conversion of an advertisement. By adjusting the configurable element according to the presentation context, the user context, or a combination thereof, the electronic system can update the media content most suited for the user consuming the media content. As a result, the electronic system can improve the content conversion of the media content for enhanced revenue for a content provider and enhanced user experience for the user operating the electronic system, the first device, the third device, or a combination thereof.

The embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiments of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with custom notification mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network. The electronic system 100 can also include a third device 108 connected to the first device 102, the second device 106, or a combination thereof with the communication path 104. The third device 108 can be a client or server.

For example, the first device 102 or the third device 108 can be of any of a variety of display devices, such as a cellular phone, personal digital assistant, wearable digital device, tablet, notebook computer, television (TV), smart TV, automotive telematic communication system, or other multi-functional mobile communication or entertainment device. The first device 102 or the third device 108 can be a standalone device, or can be incorporated with a vehicle, for example a car, truck, bus, aircraft, boat/vessel, or train. The first device 102 or the third device 108 can couple to the communication path 104 to communicate with the second device 106.

For illustrative purposes, the electronic system 100 is described with the first device 102 or the third device 108 as a mobile device, although it is understood that the first device 102 or the third device 108 can be different types of devices. For example, the first device 102 or the third device 108 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102 or the third device 108. The second device 106 can also be a client type device as described for the first device 102 or the third device 108.

In another example, the first device 102, the second device 106, or the third device 108 can be a particularized machine, such as a mainframe, a server, a cluster server, a rack mounted server, or a blade server, or as more specific examples, an IBM System z10™ Business Class mainframe or a HP ProLiant ML™ server. Yet in another example, the first device 102, the second device 106, or the third device 108 can be a particularized machine, such as a portable computing device, a thin client, a notebook, a netbook, a smartphone, personal digital assistant, or a cellular phone, and as specific examples, an Apple iPhone™, Android™ smartphone, or Windows™ platform smartphone.

For illustrative purposes, the electronic system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the electronic system 100 is shown with the second device 106 and the first device 102 or the third device 108 as end points of the communication path 104, although it is understood that the electronic system 100 can have a different partition between the first device 102, the second device 106, the third device 108, and the communication path 104. For example, the first device 102, the second device 106, the third device 108 or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
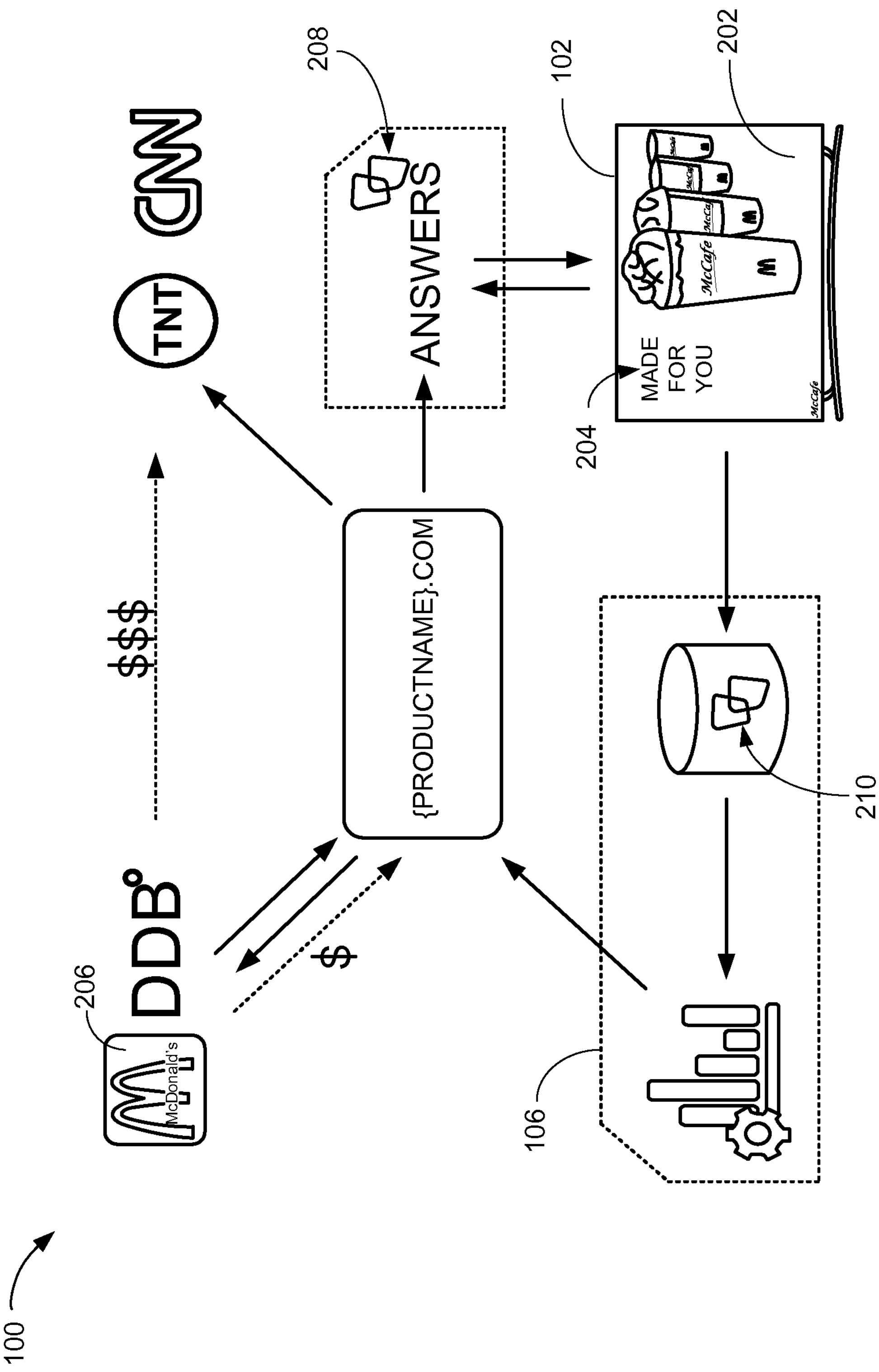
FIG. 2 is a first example of a system architecture of the electronic system.

Referring now to FIG. 2, therein is shown a first example of a system architecture of the electronic system 100. For clarity and brevity, the discussion of the present invention will focus on the first device 102, the third device 108, or a combination thereof presenting the result generated by the electronic system 100. However, the first device 102, the second device 106, or the third device 108 of FIG. 1 can be discussed interchangeably.

The electronic system 100 can provide a media content 202. In one embodiment, the media content 202 is commercial information. For example, the media content 202 can include a video information, an audio information, a text information, an image information, or a combination thereof. The media content 202 can include an advertisement 204, a TV program, a movie, a radio show, or a combination thereof. The advertisement 204 can represent the media content 202 to promote a product, service, or a combination thereof. Details will be discussed below.

In one embodiment, the electronic system 100 can receive the media content 202 from a content provider 206. The content provider 206 can provide the media content 202 for the electronic system 100 to customize the media content 202 for the user of the first device 102, the third device 108, or a combination thereof.

The media content 202 can include a content indicator 208. The content indicator 208 assists the electronic system 100 to identify whether the media content 202 is being presented. For example, the electronic system 100 can utilize an automatic content recognition (ACR) technique to identify the content indicator 208 included in the media content 202. The content indicator 208 can include watermark, fingerprint, or a combination thereof.

More specifically as an example, the electronic system 100 can compare the content indicator 208 to a stored indicator 210. The stored indicator 210 can include watermark, fingerprint, or a combination thereof that has been stored in the first device 102, the second device 106, the third device 108, or a combination thereof. The electronic system 100 can match the content indicator 208 to the stored indicator 210 to identify the media content 202 currently being displayed on the first device 102, the third device 108, or a combination thereof. Details will be discussed below.

Figure 3:
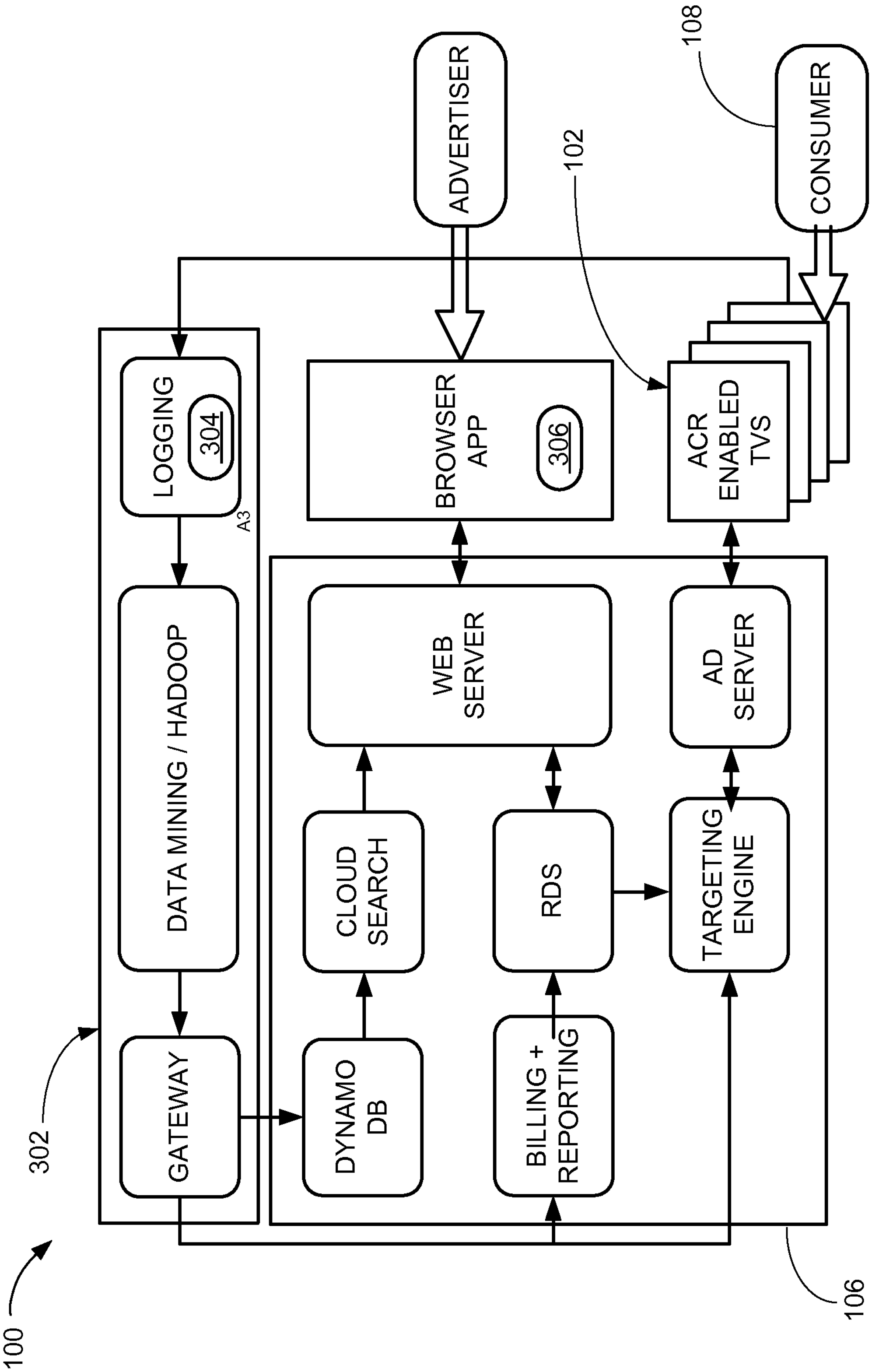
FIG. 3 is a second example of the system architecture of the electronic system.

Referring now to FIG. 3, therein is shown a second example of the system architecture of the electronic system 100. The electronic system 100 can register an account and provide a public-facing and secured log-in for an ACR enabled device, such as the first device 102 representing a Smart TV, for the first device 102 to uniquely identify the third device 108 and the ACR data associated with the third device 108.

The electronic system 100 can run on a cloud-based architecture that employs a cluster 302 of distributed instances of the second device 106 that are virtualized as a singular coherent service. The cluster 302 can include storage that aggregates the ACR data, such as the content indicator 208, the stored indicator 210, or a combination thereof, collected from many instances of the first device 102, the third device 108, or a combination thereof. The cluster 302 can perform machine learning and data mining process on the collected data to generate the media content 202 including insightful program and channel based analytics from the aggregated data set.

The data may be aggregated in a variety of instances of a time frame 304, including hourly, daily, weekly, monthly, quarterly, or in real-time 306 to provide critical metrics. The real-time 306 can represent an actual time during which a process takes place or an event occurs. The cluster 302 may also log and track the impressions, clicks, and other engagement metrics captured from the devices.

Figure 4:
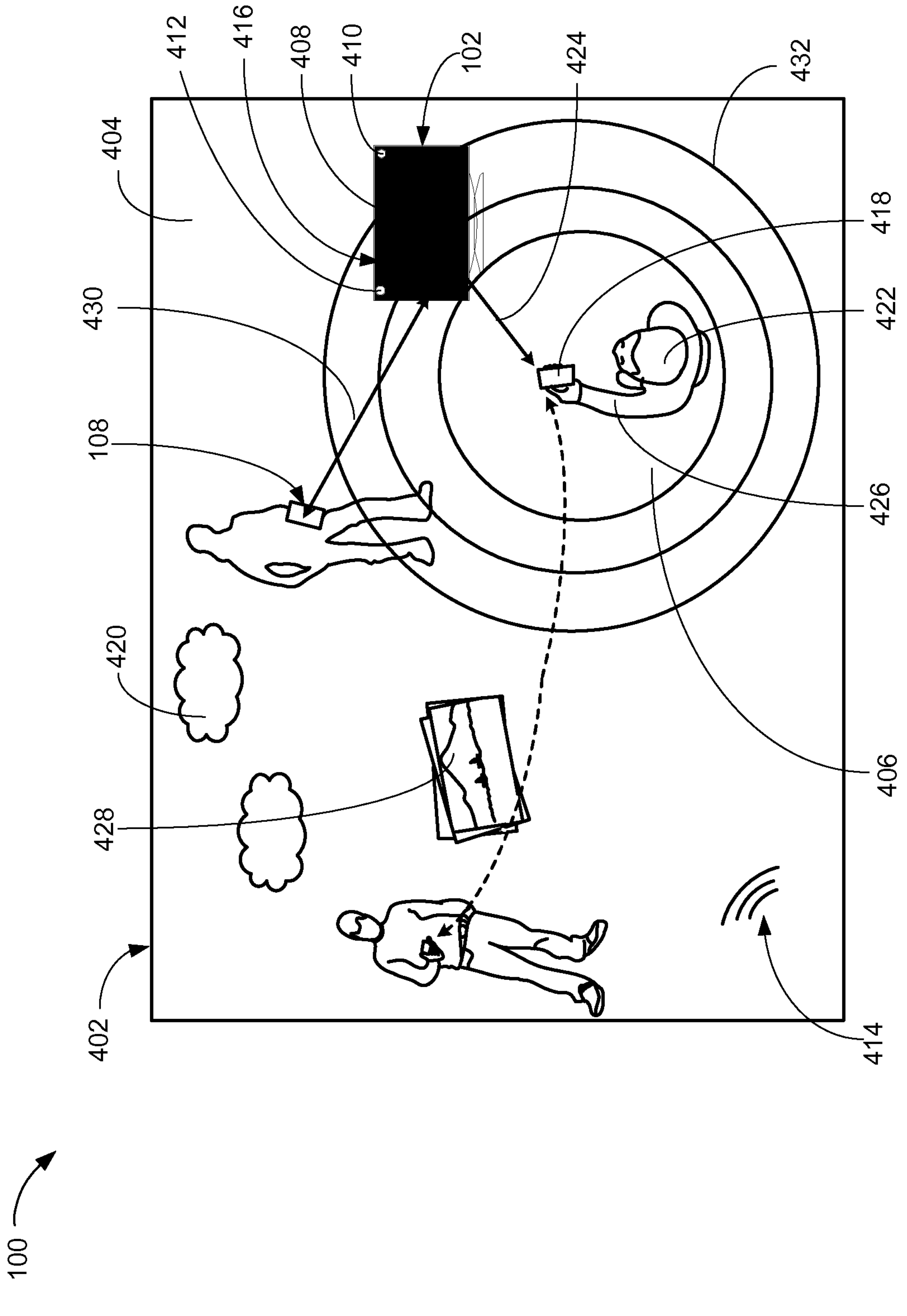
FIG. 4 is an example of a context.

Referring now to FIG. 4, therein is shown an example of a context 402. The context 402 is a situation or condition surrounding a device or related to usage of the device. For example, the context 402 can include a presentation context 404. The presentation context 404 is the context 402 surrounding the first device 102. For example, the first device 102 can represent a TV. The presentation context 404 can represent the user's home where a service location 408 of the first device 102 is located. The service location 408 can represent a physical location of the first device 102, an internet protocol address assigned to the first device 102, or a combination thereof.

The presentation context 404 can be determined based on a presence indicator 410. The presence indicator 410 is information to indicate a presence of a device. For example, the presence indicator 410 can represent the service location 408, the internet protocol address, or a combination thereof of the first device 102.

For a different example, the electronic system 100 can determine the presentation context 404 using a capturing sensor 412. The capturing sensor 412 can represent a digital camera, a video camera, a microphone, or a combination thereof. For example, the capturing sensor 412 of the first device 102 can capture the image of the user of the third device 108.

For a different example, the capturing sensor 412 can emit the acoustic sound. In response, the capturing sensor 412 representing a microphone can capture an acoustic response 414 from the acoustic sound bounced back within the presentation context 404, such as the user's room. The acoustic response 414 can represent an echo from the acoustic sound bouncing off the ceiling, walls, floor, or a combination thereof of a closed quarter.

More specifically as an example, the electronic system 100 can identify a device information 416 of the first device 102, the third device 108, or a combination thereof. The device information 416 is information to identify the device. For example, the electronic system 100 can determine the device information 416 to identify that the first device 102 can present the media content 202 of FIG. 2. For another example, the electronic system 100 can determine the device information 416 to identify that the third device 108 can be within the presentation context 404 of the first device 102.

The context 402 can include a user context 406. In one embodiment, the user context 406 is the context 402 surrounding the third device 108. For example, the third device 108 can represent a mobile device. The user context 406 can be determined based on the time frame 304 of FIG. 3, a current location 418, the environment condition 420, a user profile 422, a usage pattern 424, the media content 202 presented, or a combination thereof.

In one embodiment, the current location 418 is a physical location of the third device 108. The user profile 422 is personal information of the user of the electronic system 100. For example, the user profile 422 can include the user's preference, demographics, age, sex, profession, interest, or a combination thereof. The user profile 422 can include a usage pattern 424. The usage pattern 424 is a user's trend using the electronic system 100. For example, the usage pattern 424 can represent a user's history for viewing the media content 202 at a specific instance of the time frame 304.

For another example, the usage pattern 424 can represent the trend of a user input 426 interacting with the first device 102, the third device 108, or a combination thereof. The user input 426 can represent a manual entry, an audio command, a gesture, or a combination thereof.

The user context 406 can include the environment condition 420. More specifically as an example, the environment condition 420 can represent a natural phenomenon occurring and surrounding the user of the third device 108. For example, the environment condition 420 can represent the weather. The environment condition can represent a natural disaster, such as earthquake, tsunami, or etcetera.

The electronic system 100 can identify a user information 428. The user information 428 is information to identify the user. For example, based on the user information 428, the electronic system 100 can identify the user of the third device 108 within the presentation context 404 of the first device 102.

The user information 428 can be identified based on a proximity information 430. The proximity information 430 is the device information 416 within a reception proximity 432. For example, the proximity information 430 can represent the number of instances of the third device 108 within the reception proximity 432 of the first device 102.

The reception proximity 432 is a range to receive the media content 202 from a device. For example, the reception proximity 432 can represent a physical distance from the first device 102 that the user can view, hear, or a combination thereof the media content 202 presented on the first device 102. For another example, the reception proximity 432 can represent a wireless range between the first device 102 and the third device 108 to remain connected with the communication path 104 of FIG. 1.

Referring now to FIG. 5, therein is shown an example of the media content 202. The media content 202 can include a subcontent 502. The subcontent 502 is a subsection of the media content 202. For example, if the media content 202 represents the video clip instance of the advertisement 204 of FIG. 2, the subcontent 502 of the advertisement 204 can represent one scene from the advertisement 204.

More specifically as an example, the scene of the media content 202 can be segmented according to an event time 504. The event time 504 can represent a duration of time passed for presenting the media content 202. For example, the advertisement 204 representing a video can display a product at the event time of 12 seconds as illustrated in FIG. 5.

The media content 202, the subcontent 502, or a combination thereof can be generated based on a content template 506. The content template 506 is a framework. For example, the content template 506 can include a static element 508, a configurable element 510, or a combination thereof. The static element 508 is a fixed component within the media content 202, the subcontent 502, or a combination thereof. The configurable element 510 is an adjustable component within the media content 202, the subcontent 502, or a combination thereof.

For example, the electronic system 100 can provide the media content 202 tailored to the user by adjusting the configurable element 510 suited for the presentation context 404 of FIG. 4, the user context 406 of FIG. 4, or a combination thereof. For a specific example, the electronic system 100 can adjust the configurable element 510 by generating a map 512 to a convenient location 514 associated with the content provider 206 of FIG. 2.

The map 512 can represent a digital representation of a geographic area surrounding the service location 408 of FIG. 4, the current location 418 of FIG. 4, or a combination thereof. The convenient location 514 can represent a physical location associated to the content provider 206 closest to the current location 418, most accessible from the current location 418, or a combination thereof. For example, the convenient location 514 can represent a store associated with the content provider 206

For further example, the electronic system 100 can provide a substitution content 516. The substitution content 516 is a content to replace the original instance of the subcontent 502 to the media content 202. For example, the substitution content 516 can include a video clip, an overlay, an audio clip, the map 512, the advertisement 204, or a combination thereof. The overlay can represent a content to be presented on top of the original instance of the media content 202.

Figure 6:
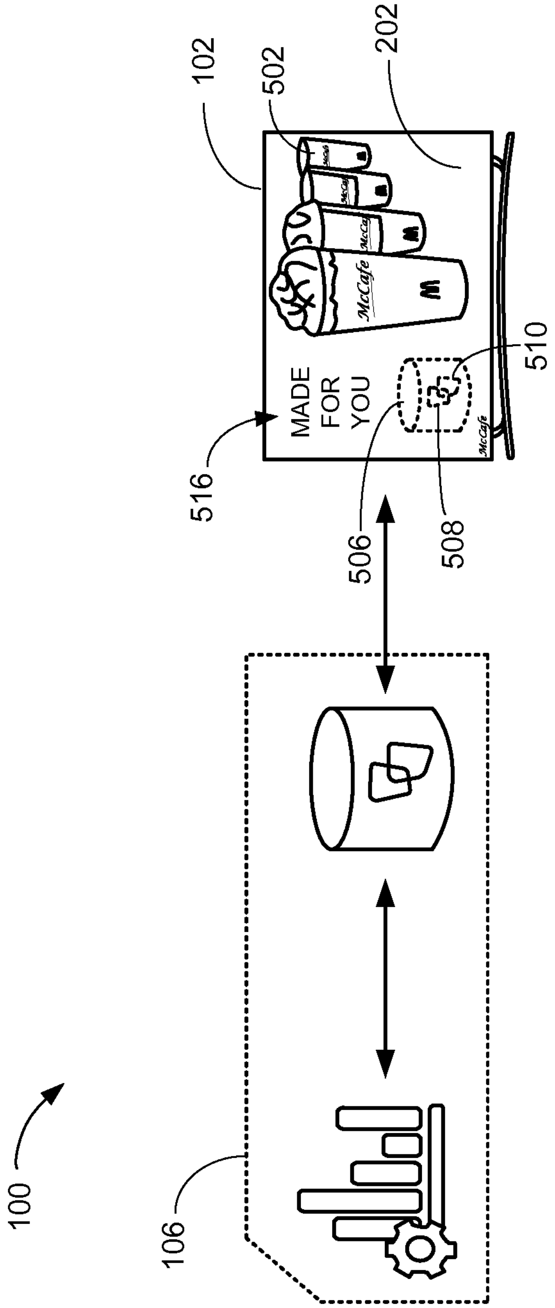
FIG. 6 is a third example of a system architecture of the electronic system

Referring now to FIG. 6, therein is shown a third example of the system architecture of the electronic system 100. The first device 102 can detect the media content 202 stored within the second device 106. Furthermore, the first device 102 can ping the second device 106 to determine whether the media content 202 includes the configurable element 510 based on the content template 506 including the static element 508, the configurable element 510, or a combination thereof.

In a different example, the first device 102 can store the media content 202. The first device 102 can determine whether the media content 202 includes the configurable element 510 based on the content template 506 including the static element 508, the configurable element 510, or a combination thereof.

If the media content 202 includes the configurable element 510, the first device 102 can update the media content 202 including the subcontent 502 based on adjusting the configurable element 510. For example, the first device 102 can obtain the substitution content 516 from the second device 106 by communicating via the communication path 104 of FIG. 1 for adjusting the configurable element 510.

The substitution content 516 can represent a video clip. The first device 102 can download the video clip in the real-time 306 of FIG. 3. Since the video clip can be a large file, downloading the video clip can prevent the media content 202 to be ready by the time the configurable element 510 is displayed. As a result, once the configurable element 510 of the media content 202 is determined, the first device 102 can preload the substitution content 516 needed.

The first device 102 can override the preloaded instance of the substitution content 516 if the substitution content 516 is ready before being displayed to the user. More specifically as an example, the first device 102 can intercept the media content 202 representing audio or video stream to stich the downloaded instance of the substitution content 516 over the preloaded instance of the substitution content 516. The first device 102 can stich the downloaded instance of the substitution content 516 at a fame-accurate level rather than by the event time 504 of FIG. 5 representing seconds. If the downloaded instance of the substitution content 516 is not ready, the first device 102 can fall back to the original instance of the subcontent 502 within the media content 202.

More specifically as an example, if the downloaded instance of the substitution content 516 is ready to be displayed, the map 512 of FIG. 5 to the convenient location 514 of FIG. 5 associated with the content provider 206 of FIG. 2 can be displayed by adjusting the configurable element 510. If the downloaded instance of the substitution content 516 is not ready for display, the original instance of the subcontent 502, such as a logo of the content provider 206, can be displayed as the static element 508. The first device 102 can determine the size and position of the subcontent 502 based on the content template 506.

Figure 7:
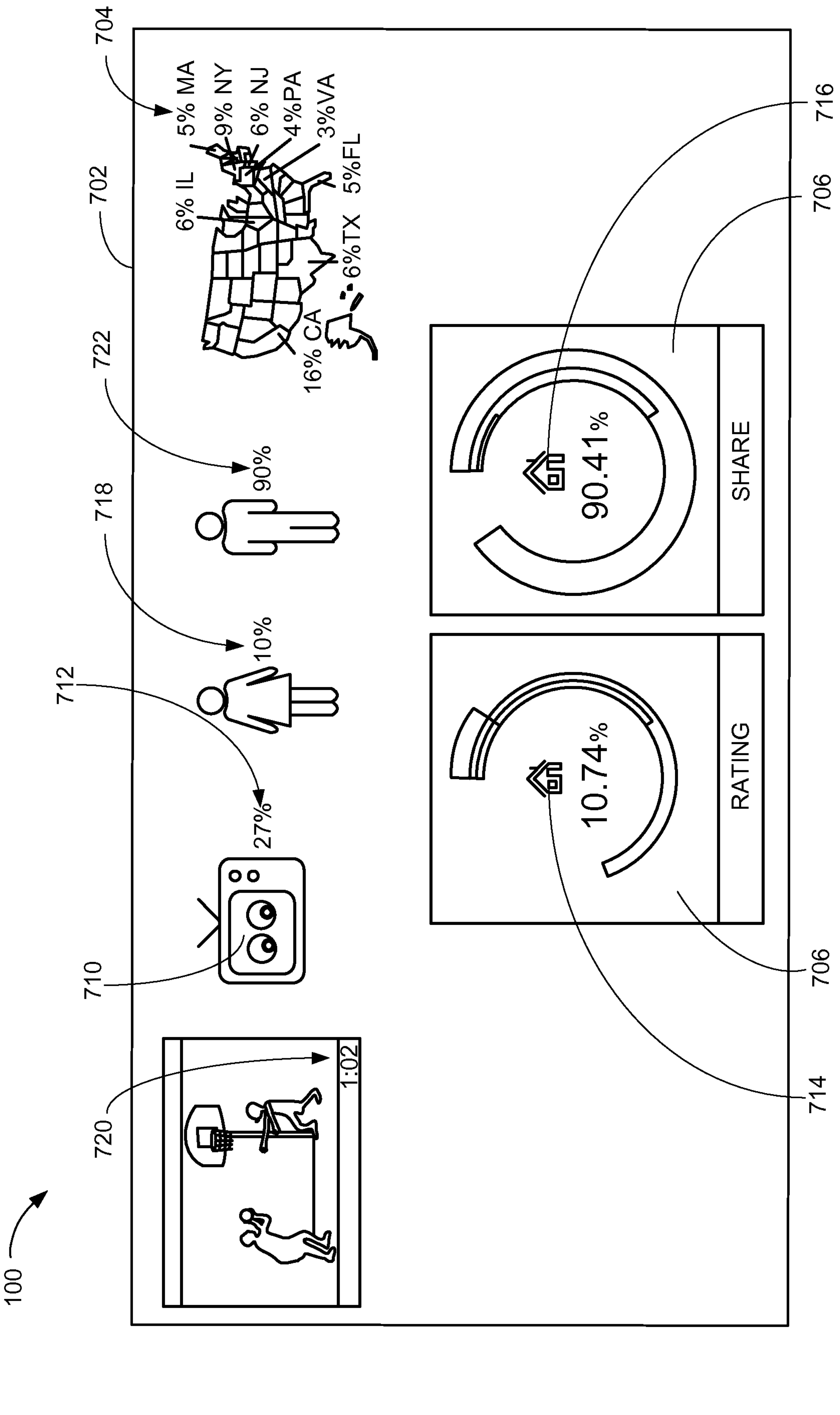
FIG. 7 is an example of a dashboard.

Referring now to FIG. 7, therein is shown an example of a dashboard 702. The dashboard 702 can display a data analytic 704 including an overall household rating 706, an overall household share 708, a household reach 710, or a combination thereof. The data analytic 704 is a result generated from determining a consumption of the media content 202. For example, the consumption of the media content 202 can include viewing, listening, interacting, or a combination thereof of the media content 202. For further example, the data analytic 704 can be generated from the user consuming the media content 202 by being present within the presentation context 404 of FIG. 4.

A content conversion 712 is user consumption of the media content 202. For example, the content conversion 712 can be determined when the user interacted with the media content 202 by making the user input 426 of FIG. 4 to the media content 202.

A household 714 can represent the unique internet protocol address. A household universe 716 can represent a number of unique internet protocol addresses with at least one instance of the first device 102 active for the time frame 304 of seven days preceding the airing of the media content 202. The household reach 710 is a cumulative ratio of the household 714 watching the media content 202 to the household universe 716.

The overall household rating 706 is a ratio of the household 714 watching the media content 202 of FIG. 2 in a given instance of the time frame 304 of FIG. 3 to the household universe 716. The time frame 304 can represent a second, minute, hour, or a combination thereof. The electronic system 100 can obtain the overall household rating 706 by averaging a minute-by-minute household rating 718 for a content duration 720 of the media content 202. The minute-by-minute household rating 718 is a rate of the household 714 watching the media content 202 in the given instance of the time frame 304. The time frame 304 can represent a second, minute, hour, or a combination thereof. The content duration 720 is a length in time from beginning to end of the media content 202.

The overall household share 708 is a ratio of the household 714 watching a specific instance of the media content 202 in a given instance of the time frame 304 to the numbers of the household 714 watching any instances of the media content 202 during the same instance of the time frame 304. The time frame 304 can represent a second, minute, hour, or a combination thereof. The electronic system 100 can obtain the overall household share 708 by averaging a minute-by-minute household share 722 for the entire instance of the content duration 720 of the media content 202. The minute-by-minute household share 722 is a rate of the household 714 watching the media content 202 in the given instance of the time frame 304. The time frame 304 can represent a second, minute, hour, or a combination thereof.

Figure 8:
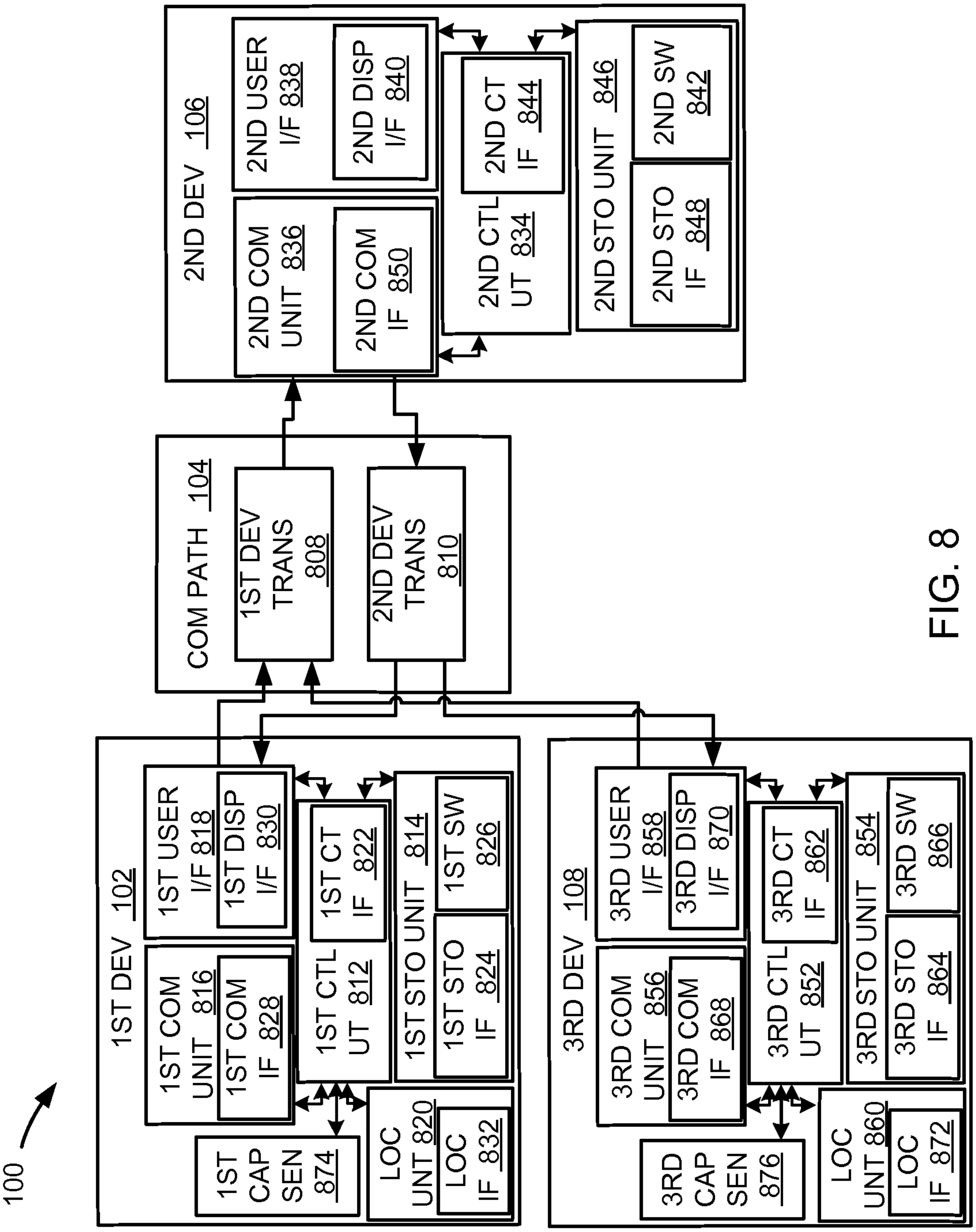
FIG. 8 is an exemplary block diagram of the electronic system.

Referring now to FIG. 8, therein is shown an exemplary block diagram of the electronic system 100. The electronic system 100 can include the first device 102, the third device 108, the communication path 104, and the second device 106. The first device 102 or the third device 108 can send information in a first device transmission 808 over the communication path 104 to the second device 106. The second device 106 can send information in a second device transmission 810 over the communication path 104 to the first device 102 or the third device 108.

For illustrative purposes, the electronic system 100 is shown with the first device 102 or the third device 108 as a client device, although it is understood that the electronic system 100 can have the first device 102 or the third device 108 as a different type of device. For example, the first device 102 or the third device 108 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 or the third device 108 will be described as a client device and the second device 106 will be described as a server device. The embodiment of the present invention is not limited to this selection for the type of devices. The selection is an example of the present invention.

The first device 102 can include a first control unit 812, a first storage unit 814, a first communication unit 816, a first user interface 818, and a first location unit 820. The first control unit 812 can include a first control interface 822. The first control unit 812 can execute a first software 826 to provide the intelligence of the electronic system 100.

The first control unit 812 can be implemented in a number of different manners. For example, the first control unit 812 can be a processor, an application specific integrated circuit (ASIC) an embedded processor, a microprocessor, a hardware control logic, a hardware finite state machine (FSM), a digital signal processor (DSP), or a combination thereof. The first control interface 822 can be used for communication between the first control unit 812 and other functional units in the first device 102. The first control interface 822 can also be used for communication that is external to the first device 102.

The first control interface 822 can receive information from the other functional units or from external sources, or can transmit information to the other functional units or to external destinations. The external sources and the external destinations refer to sources and destinations physically separate from to the first device 102.

The first control interface 822 can be implemented in different ways and can include different implementations depending on which functional units or external units are being interfaced with the first control interface 822. For example, the first control interface 822 can be implemented with a pressure sensor, an inertial sensor, a microelectromechanical system (MEMS), optical circuitry, waveguides, wireless circuitry, wireline circuitry, or a combination thereof.

The first location unit 820 can generate location information, current heading, and current speed of the first device 102, as examples. The first location unit 820 can be implemented in many ways. For example, the first location unit 820 can function as at least a part of a global positioning system (GPS), an inertial navigation system, a cellular-tower location system, a pressure location system, or any combination thereof.

The first location unit 820 can include a location interface 832. The location interface 832 can be used for communication between the first location unit 820 and other functional units in the first device 102. The location interface 832 can also be used for communication that is external to the first device 102.

The location interface 832 can receive information from the other functional units or from external sources, or can transmit information to the other functional units or to external destinations. The external sources and the external destinations refer to sources and destinations physically separate from the first device 102.

The location interface 832 can include different implementations depending on which functional units or external units are being interfaced with the first location unit 820. The location interface 832 can be implemented with technologies and techniques similar to the implementation of the first control interface 822.

The first storage unit 814 can store the first software 826. The first storage unit 814 can also store the relevant information, such as advertisements, points of interest (POI), navigation routing entries, or any combination thereof. The relevant information can also include news, media, events, or a combination thereof from the third party content provider.

The first storage unit 814 can be a volatile memory, a nonvolatile memory, an internal memory, an external memory, or a combination thereof. For example, the first storage unit 814 can be a nonvolatile storage such as non-volatile random access memory (NVRAM), Flash memory, disk storage, or a volatile storage such as static random access memory (SRAM).

The first storage unit 814 can include a first storage interface 824. The first storage interface 824 can be used for communication between and other functional units in the first device 102. The first storage interface 824 can also be used for communication that is external to the first device 102.

The first storage interface 824 can receive information from the other functional units or from external sources, or can transmit information to the other functional units or to external destinations. The external sources and the external destinations refer to sources and destinations physically separate from the first device 102.

The first storage interface 824 can include different implementations depending on which functional units or external units are being interfaced with the first storage unit 814. The first storage interface 824 can be implemented with technologies and techniques similar to the implementation of the first control interface 822.

The first communication unit 816 can enable external communication to and from the first device 102. For example, the first communication unit 816 can permit the first device 102 to communicate with the second device 106 of FIG. 1, the third device 108 of FIG. 1, an attachment, such as a peripheral device or a computer desktop, or a combination thereof over the communication path 104.

The first communication unit 816 can also function as a communication hub allowing the first device 102 to function as part of the communication path 104 and not limited to be an end point or terminal unit to the communication path 104. The first communication unit 816 can include active and passive components, such as microelectronics or an antenna, for interaction with the communication path 104.

The first communication unit 816 can include a first communication interface 828. The first communication interface 828 can be used for communication between the first communication unit 816 and other functional units in the first device 102. The first communication interface 828 can receive information from the other functional units or can transmit information to the other functional units.

The first communication interface 828 can include different implementations depending on which functional units are being interfaced with the first communication unit 816. The first communication interface 828 can be implemented with technologies and techniques similar to the implementation of the first control interface 822.

The first user interface 818 allows a user (not shown) to interface and interact with the first device 102. The first user interface 818 can include an input device and an output device. Examples of the input device of the first user interface 818 can include a keypad, a touchpad, soft-keys, a keyboard, a microphone, an infrared sensor for receiving remote signals, or any combination thereof to provide data and communication inputs.

The first user interface 818 can include a first display interface 830. The first display interface 830 can include a display, a projector, a video screen, a speaker, or any combination thereof.

The first control unit 812 can operate the first user interface 818 to display information generated by the electronic system 100. The first control unit 812 can also execute the first software 826 for the other functions of the electronic system 100, including receiving location information from the first location unit 820. The first control unit 812 can further execute the first software 826 for interaction with the communication path 104 via the first communication unit 816.

The second device 106 can be optimized for implementing the embodiment of the present invention in a multiple device embodiment with the second device 106. The second device 106 can provide the additional or higher performance processing power compared to the first device 102. The second device 106 can include a second control unit 834, a second communication unit 836, and a second user interface 838.

The second user interface 838 allows a user (not shown) to interface and interact with the second device 106. The second user interface 838 can include an input device and an output device. Examples of the input device of the second user interface 838 can include a keypad, a touchpad, soft-keys, a keyboard, a microphone, or any combination thereof to provide data and communication inputs. Examples of the output device of the second user interface 838 can include a second display interface 840. The second display interface 840 can include a display, a projector, a video screen, a speaker, or any combination thereof.

The second control unit 834 can execute a second software 842 to provide the intelligence of the second device 106 of the electronic system 100. The second software 842 can operate in conjunction with the first software 826. The second control unit 834 can provide additional performance compared to the first control unit 812.

The second control unit 834 can operate the second user interface 838 to display information. The second control unit 834 can also execute the second software 842 for the other functions of the electronic system 100, including operating the second communication unit 836 to communicate with the second device 106 over the communication path 104.

The second control unit 834 can be implemented in a number of different manners. For example, the second control unit 834 can be a processor, an embedded processor, a microprocessor, hardware control logic, a hardware finite state machine (FSM), a digital signal processor (DSP), or a combination thereof.

The second control unit 834 can include a second control interface 844. The second control interface 844 can be used for communication between the second control unit 834 and other functional units in the second device 106. The second control interface 844 can also be used for communication that is external to the second device 106.

The second control interface 844 can receive information from the other functional units or from external sources, or can transmit information to the other functional units or to external destinations. The external sources and the external destinations refer to sources and destinations physically separate from the second device 106.

The second control interface 844 can be implemented in different ways and can include different implementations depending on which functional units or external units are being interfaced with the second control interface 844. For example, the second control interface 844 can be implemented with a pressure sensor, an inertial sensor, a microelectromechanical system (MEMS), optical circuitry, waveguides, wireless circuitry, wireline circuitry, or a combination thereof.

A second storage unit 846 can store the second software 842. The second storage unit 846 can also store the relevant information, such as advertisements, points of interest (POI), navigation routing entries, or any combination thereof. The second storage unit 846 can be sized to provide the additional storage capacity to supplement the first storage unit 814.

For illustrative purposes, the second storage unit 846 is shown as a single element, although it is understood that the second storage unit 846 can be a distribution of storage elements. Also for illustrative purposes, the electronic system 100 is shown with the second storage unit 846 as a single hierarchy storage system, although it is understood that the electronic system 100 can have the second storage unit 846 in a different configuration. For example, the second storage unit 846 can be formed with different storage technologies forming a memory hierarchal system including different levels of caching, main memory, rotating media, or off-line storage.

The second storage unit 846 can be a volatile memory, a nonvolatile memory, an internal memory, an external memory, or a combination thereof. For example, the second storage unit 846 can be a nonvolatile storage such as non-volatile random access memory (NVRAM), Flash memory, disk storage, or a volatile storage such as static random access memory (SRAM).

The second storage unit 846 can include a second storage interface 848. The second storage interface 848 can be used for communication between other functional units in the second device 106. The second storage interface 848 can also be used for communication that is external to the second device 106.

The second storage interface 848 can receive information from the other functional units or from external sources, or can transmit information to the other functional units or to external destinations. The external sources and the external destinations refer to sources and destinations physically separate from the second device 106.

The second storage interface 848 can include different implementations depending on which functional units or external units are being interfaced with the second storage unit 846. The second storage interface 848 can be implemented with technologies and techniques similar to the implementation of the second control interface 844.

The second communication unit 836 can enable external communication to and from the second device 106. For example, the second communication unit 836 can permit the second device 106 to communicate with the first device 102, the third device 108, or a combination thereof over the communication path 104.

The second communication unit 836 can also function as a communication hub allowing the second device 106 to function as part of the communication path 104 and not limited to be an end point or terminal unit to the communication path 104. The second communication unit 836 can include active and passive components, such as microelectronics or an antenna, for interaction with the communication path 104.

The second communication unit 836 can include a second communication interface 850. The second communication interface 850 can be used for communication between the second communication unit 836 and other functional units in the second device 106. The second communication interface 850 can receive information from the other functional units or can transmit information to the other functional units.

The second communication interface 850 can include different implementations depending on which functional units are being interfaced with the second communication unit 836. The second communication interface 850 can be implemented with technologies and techniques similar to the implementation of the second control interface 844.

The first communication unit 816 can couple with the communication path 104 to send information to the second device 106 in the first device transmission 808. The second device 106 can receive information in the second communication unit 836 from the first device transmission 808 of the communication path 104.

The second communication unit 836 can couple with the communication path 104 to send information to the first device 102 in the second device transmission 810. The first device 102 can receive information in the first communication unit 816 from the second device transmission 810 of the communication path 104. The electronic system 100 can be executed by the first control unit 812, the second control unit 834, or a combination thereof.

For illustrative purposes, the second device 106 is shown with the partition having the second user interface 838, the second storage unit 846, the second control unit 834, and the second communication unit 836, although it is understood that the second device 106 can have a different partition. For example, the second software 842 can be partitioned differently such that some or all of its function can be in the second control unit 834 and the second communication unit 836. Also, the second device 106 can include other functional units not shown in FIG. 8 for clarity.

The third device 108 can include a third control unit 852, a third storage unit 854, a third communication unit 856, a third user interface 858, and a third location unit 860. The third control unit 852 can include a third control interface 862. The third control unit 852 can execute a third software 866 to provide the intelligence of the electronic system 100. The third control unit 852 can be implemented in a number of different manners. For example, the third control unit 852 can be a processor, an embedded processor, a microprocessor, a hardware control logic, a hardware finite state machine (FSM), a digital signal processor (DSP), or a combination thereof. The third control interface 862 can be used for communication between the third control unit 852 and other functional units in the third device 108. The third control interface 862 can also be used for communication that is external to the third device 108.

The third control interface 862 can receive information from the other functional units or from external sources, or can transmit information to the other functional units or to external destinations. The external sources and the external destinations refer to sources and destinations physically separate to the third device 108.

The third control interface 862 can be implemented in different ways and can include different implementations depending on which functional units or external units are being interfaced with the third control interface 862. For example, the third control interface 862 can be implemented with a pressure sensor, an inertial sensor, a microelectromechanical system (MEMS), optical circuitry, waveguides, wireless circuitry, wireline circuitry, or a combination thereof.

The third location unit 860 can generate location information, current heading, and current speed of the third device 108, as examples. The third location unit 860 can be implemented in many ways. For example, the third location unit 860 can function as at least a part of a global positioning system (GPS), an inertial navigation system, a cellular-tower location system, a pressure location system, or any combination thereof.

The third location unit 860 can include a location interface 872. The location interface 872 can be used for communication between the third location unit 860 and other functional units in the third device 108. The location interface 872 can also be used for communication that is external to the third device 108.

The location interface 872 can receive information from the other functional units or from external sources, or can transmit information to the other functional units or to external destinations. The external sources and the external destinations refer to sources and destinations physically separate to the third device 108.

The location interface 872 can include different implementations depending on which functional units or external units are being interfaced with the third location unit 860. The location interface 872 can be implemented with technologies and techniques similar to the implementation of the third control interface 862.

The third storage unit 854 can store the third software 866. The third storage unit 854 can also store the relevant information, such as advertisements, points of interest (POI), navigation routing entries, or any combination thereof.

The third storage unit 854 can be a volatile memory, a nonvolatile memory, an internal memory, an external memory, or a combination thereof. For example, the third storage unit 854 can be a nonvolatile storage such as non-volatile random access memory (NVRAM), Flash memory, disk storage, or a volatile storage such as static random access memory (SRAM).

The third storage unit 854 can include a third storage interface 864. The third storage interface 864 can be used for communication between the third location unit 860 and other functional units in the third device 108. The third storage interface 864 can also be used for communication that is external to the third device 108.

The third storage interface 864 can receive information from the other functional units or from external sources, or can transmit information to the other functional units or to external destinations. The external sources and the external destinations refer to sources and destinations physically separate to the third device 108.

The third storage interface 864 can include different implementations depending on which functional units or external units are being interfaced with the third storage unit 854. The third storage interface 864 can be implemented with technologies and techniques similar to the implementation of the third control interface 862.

The third communication unit 856 can enable external communication to and from the third device 108. For example, the third communication unit 856 can permit the third device 108 to communicate with the first device 102, the second device 106, an attachment, such as a peripheral device or a computer desktop, or a combination thereof over the communication path 104.

The third communication unit 856 can also function as a communication hub allowing the third device 108 to function as part of the communication path 104 and not limited to be an end point or terminal unit to the communication path 104. The third communication unit 856 can include active and passive components, such as microelectronics or an antenna, for interaction with the communication path 104.

The third communication unit 856 can include a third communication interface 868. The third communication interface 868 can be used for communication between the third communication unit 856 and other functional units in the third device 108. The third communication interface 868 can receive information from the other functional units or can transmit information to the other functional units.

The third communication interface 868 can include different implementations depending on which functional units are being interfaced with the third communication unit 856. The third communication interface 868 can be implemented with technologies and techniques similar to the implementation of the third control interface 862.

The third user interface 858 allows a user (not shown) to interface and interact with the third device 108. The third user interface 858 can include an input device and an output device. Examples of the input device of the third user interface 858 can include a keypad, a touchpad, soft-keys, a keyboard, a microphone, or any combination thereof to provide data and communication inputs.

The third user interface 858 can include a third display interface 870. The third display interface 870 can include a display, a projector, a video screen, a speaker, or any combination thereof.

The third control unit 852 can operate the third user interface 858 to display information generated by the electronic system 100. The third control unit 852 can also execute the third software 866 for the other functions of the electronic system 100, including receiving location information from the third location unit 860. The third control unit 852 can further execute the third software 866 for interaction with the communication path 104 via the third communication unit 856.

The functional units in the first device 102 can work individually and independently of the other functional units. The first device 102 can work individually and independently from the second device 106, the third device 108, and the communication path 104.

The functional units in the second device 106 can work individually and independently of the other functional units. The second device 106 can work individually and independently from the first device 102, the third device 108, and the communication path 104.

The functional units in the third device 108 can work individually and independently of the other functional units. The third device 108 can work individually and independently from the first device 102, the second device 106, and the communication path 104.

For illustrative purposes, the electronic system 100 is described by operation of the first device 102, the second device 106, and the third device 108. It is understood that the first device 102, the second device 106, the third device 108 can operate any of the modules and functions of the electronic system 100. For example, the first device 102 is described to operate the first location unit 820, although it is understood that the second device 106 or the third device 108 can also operate the first location unit 820.

A first capturing sensor 874 can be the capturing sensor 412 of FIG. 4. Examples of the first capturing sensor 874 can include a digital camera, video camera, thermal camera, night vision camera, infrared camera, x-ray camera, or the combination thereof. Examples of the first capturing sensor 874 can further include accelerometer, thermometer, microphone, wireless signal receiver, remote physiological monitoring device, light identifier, or the combination thereof.

A third capturing sensor 876 can be the capturing sensor 412. Examples of the second third sensor 876 can include a digital camera, video camera, thermal camera, night vision camera, infrared camera, x-ray camera, or the combination thereof. Examples of the third capturing sensor 876 can further include accelerometer, thermometer, microphone, wireless signal receiver, remote physiological monitoring device, light identifier, or the combination thereof.

Figure 9:
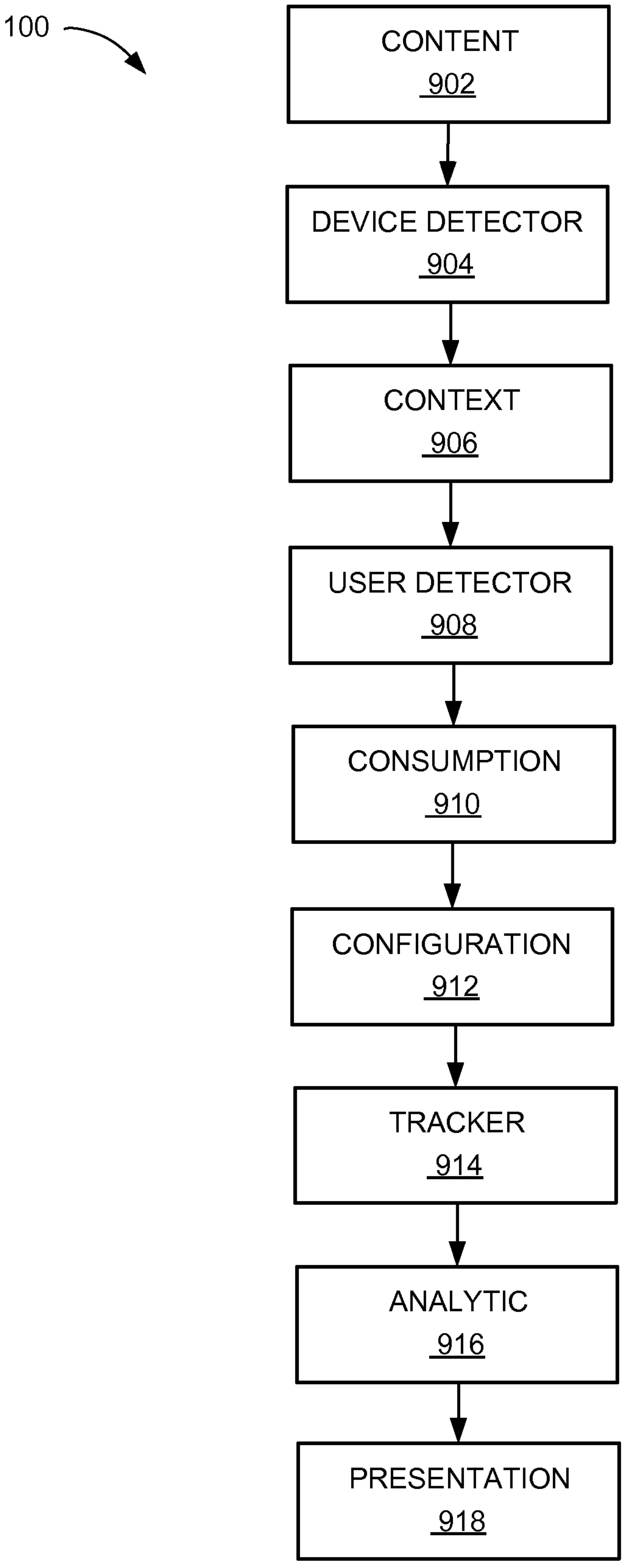
FIG. 9 is a control flow of the electronic system.

Referring now to FIG. 9, therein is shown a control flow of the electronic system 100. The electronic system 100 can include a content module 902. The content module 902 generates the media content 202 of FIG. 2. For example, the content module 902 can generate the media content 202 including the subcontent 502 of FIG. 5 based on the content template 506 of FIG. 5, the content template 506 including the static element 508 of FIG. 5, the configurable element 510 of FIG. 5, or a combination thereof.

The content module 902 can generate the media content 202 in a number of ways. For example, the content module 902 can generate the media content 202 based on data from the content provider 206 of FIG. 2 uploading the data required to be presented on the first device 102 of FIG. 1, the third device 108 of FIG. 1, or a combination thereof. The first device 102 may receive the data from the content provider 206 via the first communication unit 816 or the first control unit 812 of FIG. 8. For further example, the content module 902 can generate the media content 202 based on the content template 506 including the configurable element 510 to update the media content 202, the subcontent 502, or a combination thereof. Details will be discussed below.

For additional example, the content module 902 can generate the media content 202 including the content indicator 208 of FIG. 2. The content indicator 208 can include watermark, fingerprint, frame, metadata, or a combination thereof. Details will be discussed below. The content module 902 can communicate the media content 202 to a device detector module 904.

The electronic system 100 can include the device detector module 904, which can be coupled to the content module 902. The device detector module 904 identifies the device information 416 of FIG. 4. For example, the device detector module 904 can identify the device information 416 based on the presence indicator 410 of FIG. 4. For further example, the first control unit 812 can execute the device detector module 904 to identify the device information 416.

The device detector module 904 can identify the device information 416 in a number of ways. For example, the device detector module 904 can identify the device information 416 based on the presence indicator 410 representing the internet protocol address to identify the first device 102 connected to the second device 106. For another example, the device detector module 904 can identify the device information 416 based on the presence indicator 410 representing the device identification for the first device 102. More specifically as an example, the device identification can represent the unique serial number of the first device 102.

For a different example, the device detector module 904 can identify the device information 416 based on the presence indicator 410 representing the service provider identification which indicates the unique information about the service provider that the first device 102 uses to connect with the second device 106. For another example, the device detector module 904 can identify the device information 416 based on the presence indicator 410 representing the user profile 422 of FIG. 4. More specifically as an example, the user profile 422 can include the sign-in information to access the second device 106 by the first device 102. The device detector module 904 can identify the device information 416 of the first device 102 that the user had signed in to access the second device 106.

For further example, the device detector module 904 can identify the device information 416 based on the media content 202 communicated. More specifically as an example, the first device 102 can receive the media content 202 from the second device 106. The device detector module 904 can identify the device information 416 based on the presence indicator 410 discussed above to identify the first device 102 receiving the media content 202. The device detector module 904 can communicate the device information 416 to a context module 906.

The electronic system 100 can include the context module 906, which can be coupled to the device detector module 904. The context module 906 determines the presentation context 404 of FIG. 4. For example, the context module 906 can determine the presentation context 404 based on the service location 408 of FIG. 4. For further example, the first control unit 812 can execute the context module 906 to determine the presentation context 404.

The context module 906 can determine the presentation context 404 in a number of ways. For example, the context module 906 can determine the presentation context 404 based on the service location 408 of the first device 102 receiving the media content 202. More specifically as an example, the service location 408 can represent a physical location where the first device 102 can receive the media content 202, such as user's home. The context module 906 can determine the presentation context 404 to represent the user's home.

For another example, the context module 906 can determine the presentation context 404 based on the acoustic response 414 of FIG. 4. More specifically as an example, the context module 906 can receive the acoustic response 414 based on the capturing sensor 412 of FIG. 4 emitting the acoustic sound. The context module 906 can listen to the acoustic response 414 with the capturing sensor 412 representing a microphone of the first device 102. Based on the frequency of the acoustic response 414 from the acoustic sound bouncing back from the walls, ceiling, and floor, the context module 906 can determine the presentation context 404 of how large or small the room is.

For a different example, the context module 906 can determine the presentation context 404 based on the presence indicator 410. More specifically as an example, the presence indicator 410 can represent the internet protocol address. Based on the internet protocol address, the context module 906 can determine the presentation context 404 indicating the service location 408 where the first device 102 is presenting the media content 202.

For further example, the context module 906 can determine the presentation context 404 based on the presence indicator 410 representing the service location 408 with the first location unit 820 of FIG. 8. More specifically as an example, with the first location unit 820, the context module 906 can determine whether the first device 102 is located within the presentation context 404 representing the living room or the bedroom.

For further example, the context module 906 can determine the presentation context 404 based on the usage pattern 424 of FIG. 4. More specifically as an example, the usage pattern 424 can indicate whether the first device 102 is being used during specific instance of the time frame 304 of FIG. 3. For example, the usage pattern 424 can indicate that the first device 102 in the kitchen is being used from 7 AM to 8 AM. In contrast, the usage pattern 424 can indicate that the first device 102 in the bedroom is being used from 10 PM to 11 PM. Based on the usage pattern 424, the context module 906 can determine the presentation context 404 to represent the service location 408 of the kitchen or bedroom for example.

For a different example, the context module 906 can determine the user context 406 of FIG. 4. More specifically as an example, the context module 906 can determine the user context 406 based on the time frame 304, the current location 418 of FIG. 4, the environment condition 420 of FIG. 4, the user profile 422, the usage pattern 424, the media content 202, or a combination thereof for receiving the media content 202.

For a specific example, the context module 906 can determine the user context 406 based on the current location 418 of the third device 108 at a given instance of the time frame 304. The context module 906 can determine the current location 418 with the third location unit 860 of FIG. 8. As an example, at 10 PM, the current location 418 can represent the user's bedroom. Based on the time frame 304 and the current location 418, the context module 906 can determine the user context 406 to represent that the user of the third device 108 is in the user's bedroom.

For another example, the context module 906 can determine the user context 406 based on the environment condition 420. For a specific example, the environment condition 420 can represent the weather surrounding the current location 418. More specifically as an example, the weather can include subzero temperature, over 35 degrees Celsius, rainy, sunny, snowy, or a combination thereof. Based on the current state of the environment condition 420, the context module 906 can determine the user context 406 surrounding the current location 418.

For a different example, the context module 906 can determine the user context 406 based on the user profile 422. More specifically as an example, the user profile 422 can include the user's preference, demographics, age, sex, profession, interest, or a combination thereof. Based on the user profile 422, the context module 906 can determine the user context 406 for receiving the media content 202.

For another example, the context module 906 can determine the user context 406 based on the usage pattern 424. More specifically as an example, the usage pattern 424 can include the user input 426 of FIG. 4 made on the first user interface 818 of FIG. 8 of the first device 102, the third user interface 858 of FIG. 8 of the third device 108, or a combination thereof. The usage pattern 424 can include the capturing sensor 412 of the first device 102, the second device 106, the third device 108 tracking the user's movement, physical activity, or a combination thereof. Based on the usage pattern 424, the context module 906 can determine the user context 406 representing whether the user is in a situation to receive the media content 202. The context module 906 can communicate the presentation context 404 to a user detector module 908.

The electronic system 100 can include the user detector module 908, which can be coupled to the context module 906. The user detector module 908 identifies the user information 428 of FIG. 4. For example, the user detector module 908 can identify the user information 428 based on the device information 416, the presentation context 404, or a combination thereof. For further example, the first control unit 812 can execute the user detector module 908 to identify the user information 428.

The user detector module 908 can identify the user information 428 in a number of ways. For example, the user detector module 908 can identify the user information 428 based on the device information 416 of the third device 108 connected to the first device 102, the second device 106, or a combination thereof. More specifically as an example, the first device 102, the second device 106, the third device 108, or a combination thereof can be connected amongst each other via the communication path 104 of FIG. 1 representing Bluetooth within the electronic system 100. The Bluetooth can be version 3.0 or 4.0. The first device 102 representing the smart TV can include the capturing sensor 412 to broadcast the beacon to detect third device 108 representing a mobile device. Based on the device information 416 of the third device 108 which includes the user profile 422, the user detector module 908 can identify the user information 428.

For further example, the user detector module 908 can identify the user information 428 based on the proximity information 430 of FIG. 4. More specifically as an example, the proximity information 430 can represent a plurality of the device within the reception proximity 432 of FIG. 4. For example, a plurality of the third device 108 can be within the reception proximity 432 of the first device 102. The user detector module 908 can detect the third device 108 within the reception proximity 432 based on the capturing sensor 412 emitting an electromagnetic field or beam of electromagnetic radiation, such as an infrared to detect the third device 108. Based on detecting the third device 108, the user detector module 908 can identify the user information 428 assigned to the third device 108.

For further example, the user detector module 908 can identify the user information 428 with the first location unit 820. More specifically as an example, the user detector module 908 can identify the user information 428 to locate the first device 102, the second device 106, the third device 108, or a combination thereof using a cellular triangulation to identify whether the user of the third device 108 is within the reception proximity 432. Based on detecting the third device 108, the user detector module 908 can identify the user information 428 assigned to the third device 108.

For a different example, the user detector module 908 can identify the user information 428 based on the presentation context 404 captured by the capturing sensor 412 representing a camera. More specifically as an example, the capturing sensor 412 can capture the user with the third device 108. Based on the device information 416 of the third device 108, the user detector module 908 can identify the user information 428 by matching the image of the person to the image of the owner of the third device 108 stored on the first device 102, the second device 106, or a combination thereof.

For further example, the user detector module 908 can identify the user information 428 based on the proximity information 430, the image captured by the capturing sensor 412, or a combination thereof. More specifically as an example, based on the proximity information 430, the image captured, or a combination thereof, the user detector module 908 can determine the current location 418 of the third device 108 relative to the service location 408 of the first device 102. As a result, the based on detecting the third device 108, the user detector module 908 can identify the user information 428 of the third device 108 to identify where is the user, such as sitting, laying, or standing, relative to the first device 102. The user detector module 908 can communicate the user information 428 to a consumption module 910.

The electronic system 100 can include the consumption module 910, which can be coupled to the user detector module 908. The consumption module 910 identifies the media content 202. For example, the consumption module 910 can identify the media content 202 being presented on the first device 102, the third device 108, or a combination thereof. For further example, the first control unit 812 can execute the consumption module 910 to identify the media content 202.

The consumption module 910 can identify the media content 202 in a number of ways. For example, the consumption module 910 can identify the media content 202 based on utilizing the automatic content recognition. More specifically as an example, the media content 202 can include the content indicator 208. The content indicator 208 can represent the watermark, fingerprint, or a combination thereof.

The first storage unit 812 of FIG. 8, the second storage unit 848 of FIG. 8, the third storage unit 854 of FIG. 8, or a combination thereof can store the stored indicator 210 of FIG. 2. The consumption module 910 can compare the content indicator 208 and the stored indicator 210 to match and identify the media content 202 being presented on the first device 102, the third device 108, or a combination thereof.

For a different example, the consumption module 910 can identify the media content 202 based on the content indicator 208 representing the frame stored in the frame buffer to match with the channel from the tuner of the first device 102. For another example, the consumption module 910 can identify the media content 202 based on the content indicator 208 representing metadata retrieved from the media content 202 by the first device 102, the third device 108, or a combination thereof. For another example, the consumption module 910 can identify the media content 202 based on the user input 426 selecting the media content 202 from the first device 102, the third device 108, or a combination thereof. The consumption module 910 can communicate the media content 202 identified to a configuration module 912.

The electronic system 100 can include the configuration module 912, which can be coupled to the consumption module 910. The configuration module 912 updates the media content 202. For example, the configuration module 912 can update the media content 202 including the subcontent 502 based on adjusting the configurable element 510. For further example, the control unit 812 can execute the configuration module 912 to update the media content 202.

The configuration module 912 can update the media content 202 in a number of ways. For example, the configuration module 912 can update the media content 202 based on the device information 416, the presentation context 404, the user context 406, the user information 428, the content provider 206, or a combination thereof. As illustrated in FIG. 5, the configuration module 912 can update the media content 202 based on adjusting the configurable element 510.

For a specific example, the media content 202 can include a plurality of the subcontent 502. The subcontent 502 can be displayed based on the event time 504 of FIG. 5. As discussed above, the subcontent 502 can include the static element 508 and the configurable element 510, or a combination thereof based on the content template 506. For further example, each instances of the subcontent 502 can be based on the different instance of the content template 506, thus, including different instances of the static element 508, the configurable element 510, or a combination thereof. The configuration module 912 can update the subcontent 502 for each instances of the configurable element 510 with the substitution content 516 of FIG. 5 based on the factors discussed above in the real-time 306 of FIG. 3.

More specifically as an example, the event time 504 can represent 5 seconds into the media content 202 representing the advertisement 204 of FIG. 2 displayed on the first device 102 representing the TV. The first instance of the subcontent 502 included in the media content 202 can include the configurable element 510 representing "audience type." The user information 428 identified can represent the user within the presentation context 404 can represent a male that is single. Based on the user information 428 identified, the configuration module 912 can update the subcontent 502 by adjusting the configurable element 510 to include the substitution content 516 representing "dude." For further example, the configuration module 912 can update the subcontent 502 from "Hey {audience type}, Are you ready?" to "Hey dude, Are you ready?" The static element 508 representing "Hey . . . Are you ready?" can remain unchanged.

For additional example, the event time 504 can represent 12 seconds into the advertisement 204 being displayed on the first device 102. The second instance of the subcontent 502 can include a plurality of the configurable element 510 representing "weather" and "product." The user context 406 can represent cold winter. The product sold by the content provider 206 can represent "hot chocolate." Based on the user context 406, the content provider 206, or a combination thereof, the configuration module 912 can update the subcontent 502 by including the substitution content 516 representing a video clip by adjusting the plurality of the configurable element 510 to display hot chocolate in a winter wind.

For additional example, the event time 504 can represent 18 seconds into the advertisement 204 being displayed on the first device 102. The third instance of the subcontent 502 can include the configurable element 510 representing the convenient location 514 of FIG. 5 associated to the content provider 206. The content provider 206 associated to the advertisement 204 can represent McDonalds™. Based on the current location 418 of the user and the convenient location 514 of FIG. 5 associated to the content provider 206, the configuration module 912 can update the subcontent 502 by adjusting the configurable element 510 to provide the substitution content 516 representing the map 512 of FIG. 5 to the convenient location 514 from the current location 418 with hot chocolate being poured in the advertisement 204.

For another example, the event time 504 can represent 25 seconds into the advertisement 204 being displayed on the first device 102. The fourth instance of the subcontent 502 can include the substitution content 516 representing a coupon to be displayed on the third device 108. More specifically as an example, the user information 428 identified can provide the configuration module 912 to update the subcontent 502 to be displayed on the third device 108. For a specific example, the configuration module 912 can update the subcontent 502 to include the substitution content 516 representing an overlay to be displayed on the third device 108 suggesting the user to make the user input 426 representing the gesture of shake to obtain the coupon on the third device 108.

For further example, the configuration module 912 can update the media content 202 to include various instances of the substitution content 516. The configuration module 912 can update the media content 202 by including the substitution content 516 representing the overlay text, image, or a combination thereof dynamically within the advertisement 204. For a specific example, the configuration module 912 can update the media content 202 by including the substitution content 516 to address the user identified by name, to provide the contact information of the content provider 206 associated to the media content 202, or a combination thereof to coordinate with the event time 504.

It has been discovered that the electronic system 100 updating the media content 202 dynamically by adjusting the configurable element 510 to include the substitution content 516 improves the efficiency of delivering the media content 202 most suited for the user. By adjusting the configurable element 510, the electronic system 100 can provide the media content 202 more relevant to the user. As a result, the electronic system 100 improves the efficiency of the delivery of the media content 202 for enhanced user experience operating the electronic system 100, the first device 102, the third device 108, or a combination thereof.

For a different example, the configuration module 912 can update the media content 202 by altering the audio play back within the advertisement 204 dynamically with the substitution content 516 representing the audio play back tailored to the user information 428. For a specific example, the configuration module 912 can update the media content 202 by including the substitution content 516 with the audio pattern changed to suit to the user information 428 by addressing the user's name, providing the contact information of the content provider 206, or a combination thereof.

For another example, the configuration module 912 can update the media content 202 by selecting the substitution content 516 based on the current location 418 of the user relative to the service location 408 of first device 102, the third device 108, or a combination thereof displaying the media content 202. More specifically as an example, the configuration module 912 can update the media content 202 by selecting the substitution content 516 representing a video clip that is oriented towards the current location 418 of the user. As an example, if the current location 418 is right or left to the service location 408, the configuration module 912 can select the substitution content 516 oriented towards the current location 418 dynamically.

It has been discovered that the electronic system 100 updating the media content 202 dynamically based on the current location 418 relative to the service location 408 improves the efficiency of delivering the media content 202 to the user. By providing the substitution content 516 that is oriented towards the current location 418, the user can better consume the media content 202. As a result, the electronic system 100 can improve the efficiency of the delivering the media content 202 to achieve higher consumption of the media content 202 by the user.

For a different example, as discussed above, the configuration module 912 can update the media content 202 by cutting, splicing, interleaving, or a combination thereof the substitution content 516 by adjusting the configurable element 510 according to the content template 506. More specifically as an example, the configuration module 912 can update the media content 202 to include the substitution content 516 suited for the presentation context 404, the user context 406, or a combination thereof.

It has been discovered that the electronic system 100 updating the media content 202 dynamically by adjusting the configurable element 510 according to the presentation context 404, the user context 406, or a combination thereof improves the content conversion 712 of FIG. 7 of the advertisement 204. By adjusting the configurable element 510 according the presentation context 404, the user context 406, or a combination thereof, the electronic system 100 can update the media content 202 most suited for the user consuming the media content 202. As a result, the electronic system 100 can improve the content conversion 712 of the media content 202 for enhanced revenue for the content provider 206 and enhanced user experience for the user operating the electronic system 100, the first device 102, the third device 108, or a combination thereof.

For further example, as discussed above, the configuration module 912 can update the media content 202 by including the substitution content 516 representing the map 512 to the convenient location 514 associated to the content provider 206 from the current location 418. For another example, the configuration module 912 can push the substitution content 516 representing a promotional offer, such as coupon, contact information, or a combination thereof in addition to the media content 202 to the first device 102, the third device 108, or a combination thereof.

For another example, the media content 202 can represent the advertisement 204 for insurance. The configuration module 912 can update the media content 202 by adjusting the configurable element 510 of "insurance agent name" to "Paul" to generate the subcontent 502 representing a video clip including "your nearest insurance agent is Paul." Further, the media content 202 can include additional instance of the configurable element 510 within the subcontent 502. The configurable element 510 can represent information related to the content provider 206 at the convenient location 514 to the current location 418. When the video clip is displayed pointing to the configurable element 510 for the convenient location 514, the configuration module 912 can update the media content 202 to adjust the configurable element 510 to display the contact information of Paul.

The electronic system 100 can include a tracker module 914, which can be coupled to the configuration module 912. The tracker module 914 tracks the media content 202. For example, the tracker module 914 can track the media content 202 interacted according to the user information 428, the presentation context 404, the user context 406, or a combination thereof. For further example, the first control unit 812 can execute the tracker module 914 to track the media content 202.

The tracker module 914 can track the media content 202 in a number of ways. For example, the tracker module 914 can track the media content 202 based on the user input 426 received. More specifically as an example, the tracker module 914 can track the media content 202 that received the user input 426 or not based on certain instances of the presentation context 404, the user context 406, or a combination thereof.

For further example, the tracker module 914 can track the content conversion 712 of the media content 202 representing the advertisement 204 offered to identify the media content 202 relevant to the user information 428. More specifically as an example, by tracking the content conversion 712, the media content 202 can determine the media content 202 relevant to the user under certain instances of the presentation context 404, the user context 406, or a combination thereof. The tracker module 914 can communicate the content conversion 712 to an analytic module 916.

The electronic system 100 can include the analytic module 916, which can be coupled to the tracker module 914.

The analytic module 916 calculates the data analytic 704 of FIG. 7. For example, the analytic module 916 can calculate the data analytic 704 including the overall household rating 706 of FIG. 7, the overall household share 708 of FIG. 7, the household reach 710 of FIG. 7, or a combination thereof dynamically and in near instance of the real-time 306 based on the content conversion 712. For further example, the first control unit 812 can execute the analytic module 916 to calculate the data analytic 704.

The analytic module 916 can calculate the data analytic 704 in a number of ways. For example, the analytic module 916 can calculate the data analytic 704 representing the overall household rating 706 for given instance of the media content 202 based on averaging a plurality of the minute-by-minute household rating 718 of FIG. 7 for the content duration 720 of the media content 202. The analytic module 916 can calculate the overall household rating 706 based on the following equations:

$$ratingNum(P_x, M_i) = \text{Number of active households watching } P_x \text{ during minute } M_i$$

$$ratingDenom(P_x) = \text{Number of active households during 8 days prececing } P_x$$

$$progDur(P_x) = \{M_i \mid \text{airtime}(P_x) \leq M_i \leq \text{airtime}(P_x) + \text{duration}(P_x)\}$$

$$\text{rating}(P_x, M_i) = \frac{ratingNum(P_x, M_i)}{ratingDenom(P_x)}$$

$$\text{rating}(P_x) = \frac{\sum_{M_i \in duration(P_x)} \text{rating}(P_x, M_i)}{|progDur(P_x)|}$$

"$P_x$" can represent the media content 202. "$M_i$" can represent the event time 504.

For a different example, the analytic module 916 can calculate the data analytic 704 representing the overall household share 708 for given instance of the media content 202 based on averaging a plurality of the minute-by-minute household share 722 of FIG. 7 for the content duration 720 in its entirety of the media content 202. The analytic module 916 can calculate the overall household share 708 based on the following equations:

$$shareNum(P_x, M_i) = \text{Number of active households watching } P_x \text{ during minute } M_i$$

$$shareDenom(M_i) = \text{Number of active households watching TV during minute } M_i$$

$$\text{share}(P_x, M_i) = \frac{shareNum(P_x, M_i)}{shareDenom(M_i)}$$

$$progDur(P_x) = \{M_i \mid \text{airtime}(P_x) \leq M_i \leq \text{airtime}(P_x) + \text{duration}(P_x)\}$$

$$\text{share}(P_x) = \frac{\sum_{M_i \in duration(P_x)} \text{share}(P_x, M_i)}{|progDur(P_x)|}$$

For a different example, the analytic module 916 can calculate the data analytic 704 representing the household reach 710 based the household (614) divided by the household universe (616) as illustrated below. The analytic module 916 can calculate the household reach 710 based on the following equations:

$$progDur(P_x) = \{M_i \mid \text{airtime}(P_x) \leq M_i \leq \text{airtime}(P_x) + \text{duration}(P_x)\}$$

$$reachNum(P_x) = \text{Number of active households watching } P_x \text{ during } progDur(P_x)$$

$$reachDenom(P_x) = \text{Number of active households during 8 days prececing } P_x$$

$$\text{reach}(P_x) = \frac{reachNum(P_x)}{reachDenom(P_x)}$$

The analytic module 916 can communicate the overall household rating 706, the overall household share 708, the household reach 710, or a combination thereof to a presentation module 918.

The electronic system 100 can include the presentation module 918, which can be coupled to the analytic module 916. The presentation module 918 presents the dashboard 702 of FIG. 7. For example, the presentation module 918 can present the dashboard 702 for displaying the data analytics on the first device 102, the second device 106, the third device 108, or a combination thereof. For further example, the first control unit 812 can execute the presentation module 918 to present the dashboard 702.

As discussed, the electronic system 100 can generate the media content 202 for presenting on the first device 102. The media content 202 can include the subcontent 502 based on the content template 506 indicating the static element 508, the configurable element 510, or a combination thereof.

In order for updating the media content 202 suited for the context 402, the electronic system 100 can identify the device information 416, the user information 428, or a combination thereof. Furthermore, the electronic system 100 can identify the media content 202 being consumed according to the content indicator 208. As a result, the electronic system 100 can update media content 202 to include the subcontent 502 suited for the context 402 detected by adjusting the configurable element 510.

The electronic system 100 can track the media content 202 interacted to according to the context 402, the user information 428, or a combination thereof. Accordingly, the electronic system 100 can calculate the data analytic 704 based on the media content 202 to determine the overall household rating 706, the overall household share 708, the household reach 710, or a combination thereof.

Furthermore, the first device 102 can represent a TV or smart TV. The embodiment of the present invention can be backward compatible to the TV that cannot handle the dynamic creation of the media content 202. More specifically as an example, the first device 102 represent the TV can display the media content 202 including the static element 502. The configurable element 510 of the media content 510 can be substituted with the substitution content 516 for the static element 508.

The physical transformation from moving within the presentation context 404 results in the movement in the physical world, such as people using the first device 102, the third device 108, or a combination thereof based on the operation of the electronic system 100. As the movement in the physical world occurs, the movement itself creates additional information that is converted back into updating the media content 202, the subcontent 502, or a combination thereof based on the device information 416, the user information 428, or a combination thereof identified.

The first software 826 of FIG. 8 of the first device 102 of FIG. 8 can include the electronic system 100. For example, the first software 826 can include the content module 902, the device detector module 904, the context module 906, the user detector module 908, the consumption module 910, the configuration module 912, the tracker module 914, the analytic module 916, and the presentation module 918.

The first control unit 812 of FIG. 8 can execute the first software 826 for the content module 902 to generate the media content 202. The first control unit 812 can execute the first software 826 for the device detector module 904 to identify the device information 416. The first control unit 812 can execute the first software 826 for the context module 906 to determine the presentation context 404, the user context 406, or a combination thereof. The first control unit 812 can execute the first software 826 for the user detector module 908 to identify the user information 428.

The first control unit 812 can execute the first software 826 for the consumption module 910 to identify the media content 202. The first control unit 812 can execute the first software 826 for the configuration module 912 to update the media content 202. The first control unit 812 can execute the first software 826 for the tracker module 914 to track the media content 202. The first control unit 812 can execute the first software 826 for the analytic module 916 to calculate the data analytic 704. The first control unit 812 can execute the first software 826 for the presentation module 918 to present the dashboard 702.

The second software 842 of FIG. 8 of the second device 106 of FIG. 8 can include the electronic system 100. For example, the second software 842 can include the content module 902, the device detector module 904, the context module 906, the user detector module 908, the consumption module 910, the configuration module 912, the tracker module 914, the analytic module 916, and the presentation module 918.

The second control unit 834 of FIG. 8 can execute the second software 842 for the content module 902 to generate the media content 202. The second control unit 834 can execute the second software 842 for the device detector module 904 to identify the device information 416. The second control unit 834 can execute the second software 842 for the context module 906 to determine the presentation context 404, the user context 406, or a combination thereof. The second control unit 834 can execute the second software 842 for the user detector module 908 to identify the user information 428.

The second control unit 834 can execute the second software 842 for the consumption module 910 to identify the media content 202. The second control unit 834 can execute the second software 842 for the configuration module 912 to update the media content 202. The second control unit 834 can execute the second software 842 for the tracker module 914 to track the media content 202. The second control unit 834 can execute the second software 842 for the analytic module 916 to calculate the data analytic 704. The second control unit 834 can execute the second software 842 for the presentation module 918 to present the dashboard 702.

The third software 866 of FIG. 8 of the third device 108 of FIG. 8 can include the electronic system 100. For example, the third software 866 can include the content module 902, the device detector module 904, the context module 906, the user detector module 908, the consumption module 910, the configuration module 912, the tracker module 914, the analytic module 916, and the presentation module 918.

The third control unit 852 of FIG. 8 can execute the third software 866 for the content module 902 to generate the media content 202. The third control unit 852 can execute the third software 866 for the device detector module 904 to identify the device information 416. The third control unit 852 can execute the third software 866 for the context module 906 to determine the presentation context 404, the user context 406, or a combination thereof. The third control unit 852 can execute the third software 866 for the user detector module 908 to identify the user information 428.

The third control unit 852 can execute the third software 866 for the consumption module 910 to identify the media content 202. The third control unit 852 can execute the third software 866 for the configuration module 912 to update the media content 202. The third control unit 852 can execute the third software 866 for the tracker module 914 to track the media content 202. The third control unit 852 can execute the third software 866 for the analytic module 916 to calculate the data analytic 704. The third control unit 852 can execute the third software 866 for the presentation module 918 to present the dashboard 702.

The electronic system 100 can be partitioned between the first software 826, the second software 842, and the third software 866. For example, the second software 842 can include the content module 902, the device detector module 904, the context module 906, the user detector module 908, the consumption module 910, the configuration module 912, the tracker module 914, and the analytic module 916. The second control unit 834 can execute modules partitioned on the second software 842 as previously described.

The first software 826 can include the presentation module 918. Based on the size of the first storage unit 814 of FIG. 8, the first software 826 can include additional modules of the electronic system 100. The first control unit 812 can execute the modules partitioned on the first software 826 as previously described.

The third software 866 can include the presentation module 918. Based on the size of the third storage unit 854 of FIG. 8, the third software 866 can include additional modules of the electronic system 100. The third control unit 852 can execute the modules partitioned on the third software 866 as previously described.

The first control unit 812 can operate the first communication interface 828 of FIG. 8 to communicate the media content 202, the device information 416, the presentation context 404, the user context 406, the user information 428, the content conversion 712, the data analytic 704, the dashboard 702, or a combination thereof to or from the second device 106, the third device 108, or a combination thereof. The first control unit 812 can operate the first software 826 to operate the first location unit 820 of FIG. 8.

The second control unit 834 can operate the second communication interface 850 of FIG. 8 to communicate the media content 202, the device information 416, the presentation context 404, the user context 406, the user information 428, the content conversion 712, the data analytic 704, the dashboard 702, or a combination thereof to or from the first device 102, the third device 108, or a combination thereof. The third control unit 852 can operate the third communication interface 868 of FIG. 8 to communicate the media content 202, the device information 416, the presentation context 404, the user context 406, the user information 428, the content conversion 712, the data analytic 704, the dashboard 702, or a combination thereof to or from the first device 102, the second device 106, or a combination thereof. The third control unit 852 can operate the third software 866 to operate the third location unit 860.

The first control unit 812 can operate the first user interface 818 of FIG. 8 to present the media content 202, the data analytic 704, the dashboard 702, or a combination thereof on the first device 102. The second control unit 834 can operate the second user interface 838 of FIG. 8 to present the media content 202, the data analytic 704, the dashboard 702, or a combination thereof on the second device 106. The third control unit 852 can operate the third user interface 858 to present the media content 202, the data analytic 704, the dashboard 702, or a combination thereof on the third device 108.

The electronic system 100 describes the module functions or order as an example. The modules can be partitioned differently. For example, the device detector module 904 and the user detector module 908 can be combined. Each of the modules can operate individually and independently of the other modules. Furthermore, data generated in one module can be used by another module without being directly coupled to each other. For example, the configuration module 912 can receive the media content 202 directly from the content module 902. The word "communicating" can represent sending, receiving, or a combination thereof.

The modules described in this application can be hardware implementation or hardware accelerators in the first control unit 812 or in the second control unit 834. The modules can also be hardware implementation or hardware accelerators within the first device 102 or the second device 106 but outside of the first control unit 812 or the second control unit 834, respectively as depicted in FIG. 8. However, it is understood that the first device 102, the second device 106, the third device 108, or a combination thereof can collectively refer to all hardware accelerators for the modules.

The modules described in this application can be implemented as instructions stored on a non-transitory computer readable medium to be executed by the first device 102, the second device 106, or a combination thereof. The non-transitory computer medium can include the first storage unit 814, the second storage unit 846 of FIG. 8, the third storage unit 854, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

Figure 10:
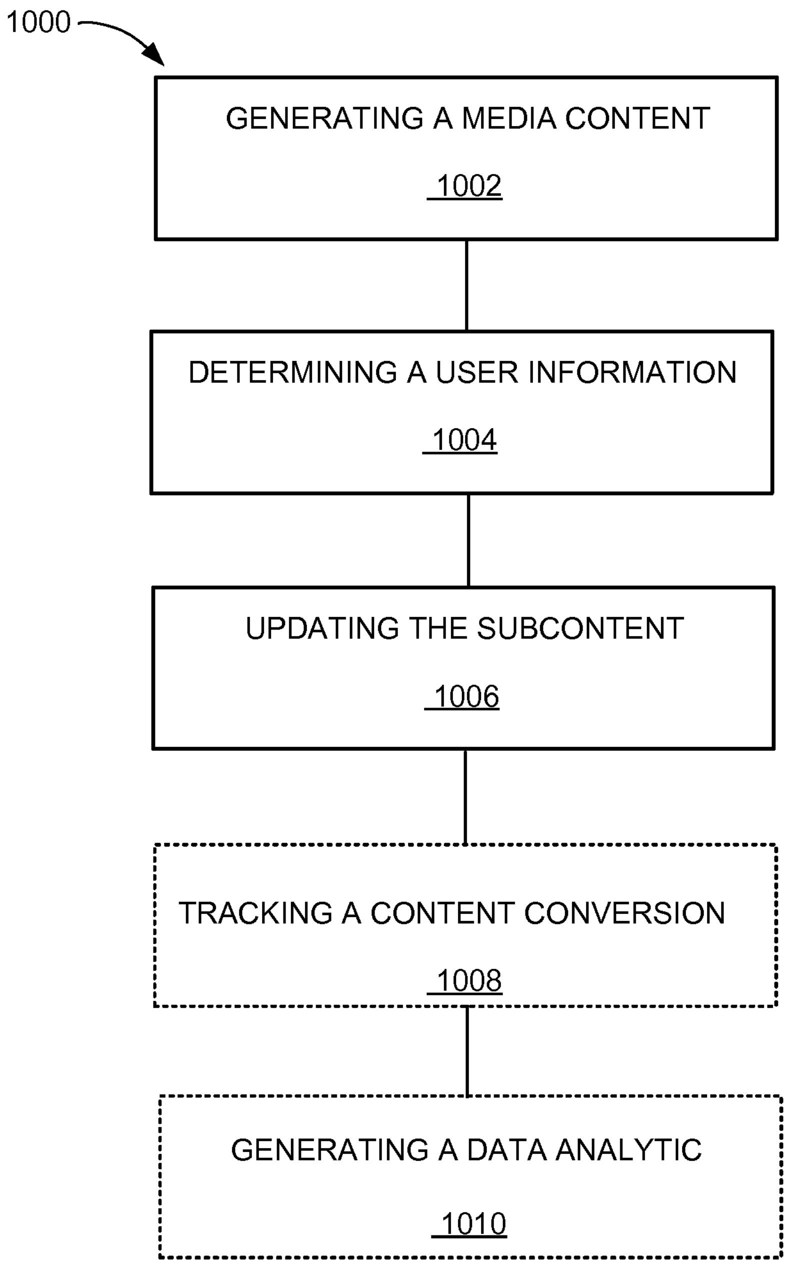
FIG. 10 is an exemplary flow chart of a method of operation of the electronic system of FIG. 1 in a further embodiment.

Referring now to FIG. 10, therein is shown an exemplary flow chart of a method 1000 of operation of the electronic system 100 of FIG. 1 in a further embodiment. The exemplary flow chart 1000 includes: generating a media content for presenting on a device including a subcontent based on a content template, which includes a configurable element in a block 1002. The electronic system 100 can execute the content module 902 of FIG. 9 to generate the media content 202 of FIG. 2 for presenting on the first device 102 of FIG. 1 including the subcontent 502 of FIG. 5 based on the content template 506 of FIG. 5, which includes the configurable element 510 of FIG. 5.

The exemplary flow chart 1000 can further include determining a user information with a control unit for identifying the device within a context in a block 1004. The electronic system 100 can execute the user detector module 908 of FIG. 0 to determine the user information 428 of FIG. 4 for identifying the first device 102 within the context 402 of FIG. 4.

The exemplary flow chart 1000 can further include updating the subcontent with the configurable element, which is adjusted based on the media content and the context for presenting on the device in a block 1006. The electronic system 100 can execute the configuration module 912 of FIG. 9 to update the subcontent 502 with the configurable element 510, which is adjusted based on the media content 202 and the context 402 for presenting on the first device 102.

The exemplary flow chart 1000 can further include tracking a content conversion of the media content representing an advertisement offered for identifying the media content relevant to the user information in a block 1008. The electronic system 100 can execute the tracker module 914 of FIG. 9 to track the content conversion 712 of FIG. 7 of the media content 202 representing the advertisement 204 of FIG. 2 offered for identifying the media content 202 relevant to the user information 428.

The exemplary flow chart 1000 can further include generating a data analytic based on tracking the media content interacted according to the user information, the context, or a combination thereof in a block 1010. The electronic system 100 can execute the analytic module 916 of FIG. 9 to generate the data analytic 704 of FIG. 7 based on tracking the media content 202 interacted according to the user information 428, the context 402, or a combination thereof.

It has been discovered that the electronic system 100 generating the media content 202 of FIG. 2 for presenting on the first device 102 of FIG. 1 including the subcontent 502 of FIG. 5 based on the configurable element 510 of FIG. 5 improves the efficiency of delivering the media content 202 to the user. The electronic system 100 can determine the user information 428 of FIG. 4 for identifying the first device 102 within the context 402 of FIG. 4. As a result, the electronic system 100 can update the subcontent 502 with the configurable element 510 adjusted based on the media content 202 and the context 402 for presenting on the first device 102 efficiently.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:

a hardware control unit configured to:

generate a media content for presenting on a first device including a subcontent based on a content template, which includes a configurable element, wherein the configurable element is an adjustable component of the subcontent, determine a user information for identifying the first device within a context, update the subcontent dynamically in real-time at an event time, the event time corresponding to a specified event within the media content and representing a specific time after a start time of presenting the media content, by adjusting the configurable element based on the media content, the context, and the user information, wherein updating the subcontent is based on a current location of the first device relative to a service location of a second device, wherein the service location of the second device represents an internet protocol address, generate data analytics, wherein generating the data analytics comprises tracking the media content based on the user information or the context, and representing an overall household rating calculated based on a plurality of real-time household ratings for a content duration of the media content; and communicate, by a communication interface coupled to the hardware control unit, the subcontent for presenting on the first device, wherein the subcontent presented on the first device comprises a location to access a content provider associated with the media content.

2. The electronic system as claimed in claim 1, wherein the hardware control unit is configured to track a content conversion of the media content representing an advertisement offered for identifying the media content relevant to the user information.

3. The electronic system as claimed in claim 1, wherein the hardware control unit is configured to generate the media content including a static element and the configurable element for presenting on the first device.

4. The electronic system as claimed in claim 1, wherein the hardware control unit is configured to update the configurable element of the subcontent in real-time.

5. The electronic system as claimed in claim 1, wherein the hardware control unit is configured to update the media content by selecting a substitution content based on the current location of the first device relative to the service location of the second device, wherein the current location of the first device is based on a physical location of a mobile device belonging to a user and the service location of the second device further represents a physical location of the second device displaying an advertisement.

6. A method of operation of an electronic system comprising:

generating a media content for presenting on a first device including a subcontent based on a content template, which includes a configurable element, wherein the configurable element is an adjustable component of the subcontent;

determining, with a hardware control unit, a user information for identifying the first device within a context;

updating the subcontent dynamically in real-time at an event time, the event time corresponding to a specified event within the media content and representing a specific time after a start time of presenting the media content, by adjusting the configurable element based on the media content, the context, and the user information for presenting on the first device, wherein updating the subcontent is based on a current location of the first device relative to a service location of a second device, wherein the service location of the second device represents an internet protocol address; and generating a data analytics, wherein generating the data analytics comprises tracking the media content based on the user information or the context, and representing an overall household rating calculated based on a plurality of real-time household ratings for a content duration of the media content;

communicating, by a communication interface coupled to the hardware control unit, the subcontent for presenting on the first device, wherein the subcontent presented on the first device comprises a location to access a content provider associated with the media content.

7. The method as claimed in claim 6, further comprising tracking a content conversion of the media content representing an advertisement offered for identifying the media content relevant to the user information.

8. The method as claimed in claim 6, wherein generating the media content includes generating the media content including a static element and the configurable element for presenting on the first device.

9. A non-transitory computer readable medium including instructions configured to, when executed by a processor, cause the processor to:

generate a media content for presenting on a first device including a subcontent based on a content template, which includes a configurable element, wherein the configurable element is an adjustable component of the subcontent;

determine a user information for identifying the first device within a context;

update the subcontent dynamically in real-time at an event time, the event time corresponding to a specified event within the media content and representing a specific time after a start time of presenting the media content, by adjusting the configurable element based on the media content, the context, and the user information for presenting on the first device, wherein updating the subcontent is based on a current location of the first device relative to a service location of a second device, wherein the service location of the second device represents an internet protocol address; and generate data analytics, wherein generating the data analytics comprises tracking the media content based on the user information or the context, and representing an overall household rating calculated based on a plurality of real-time household ratings for a content duration of the media content;

communicate, by a communication interface, the subcontent for presenting on the first device, wherein the subcontent presented on the first device comprises a location to access a content provider associated with the media content.

10. The non-transitory computer readable medium as claimed in claim 9, further comprising instructions configured to cause the processor to track a content conversion of the media content representing an advertisement offered for identifying the media content relevant to the user information.

11. The non-transitory computer readable medium as claimed in claim 9, wherein instructions configured to cause the processor to generate the media content includes generating the media content including a static element and the configurable element for presenting on the first device.

* * * * *